(12) United States Patent
Jung et al.

(10) Patent No.: US 10,496,225 B2
(45) Date of Patent: Dec. 3, 2019

(54) ELECTRONIC DEVICE AND OPERATING METHOD THEROF

(71) Applicant: Samsung Electronics Co., Ltd, Gyeonggi-do (KR)

(72) Inventors: Minkyu Jung, Seoul (KR); Sungbin Kuk, Seoul (KR); Hark-Joon Kim, Gyeonggi-do (KR); Seonghoon Kang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 15/475,047

(22) Filed: Mar. 30, 2017

(65) Prior Publication Data

US 2017/0285871 A1 Oct. 5, 2017

(30) Foreign Application Priority Data

Mar. 30, 2016 (KR) ........................ 10-2016-0038243

(51) Int. Cl.
*G06F 3/042* (2006.01)
*G06F 1/16* (2006.01)
(Continued)

(52) U.S. Cl.
CPC ............ *G06F 3/0421* (2013.01); *G06F 1/163* (2013.01); *G06F 1/1692* (2013.01); *G06F 1/1694* (2013.01); *G06F 3/014* (2013.01); *G06F 3/015* (2013.01); *G06F 3/016* (2013.01); *G06F 3/017* (2013.01); *G06F 3/03545* (2013.01); *G06F 3/03547* (2013.01); *G06F 3/0416* (2013.01);
(Continued)

(58) Field of Classification Search
None
See application file for complete search history.

(56) References Cited

U.S. PATENT DOCUMENTS 7,023,426 B1 4/2006 Robinson
8,624,836 B1 1/2014 Miller et al.
(Continued)

FOREIGN PATENT DOCUMENTS

KR 1020140021166 A 2/2014
KR 1020140137227 A 12/2014
(Continued)

OTHER PUBLICATIONS

S.W. Kang, et al., "Trends of Human Body Communications", Electronics and Telecommuncations Research Institute 28th Issue, Apr. 2, 2013, 8 pages.
(Continued)

*Primary Examiner* — Kenneth B Lee, Jr.

(57) ABSTRACT

An electronic device includes a contact sensing module for sensing a human body contact of a conductive object located outside the electronic device. The electronic device also has a position sensing module for sensing a contact position of the human body with which the conductive object is in contact from outside the electronic device. In addition a processor is included for displaying a graphic in a region of a display corresponding to the sensed contact position when a position of the human body is sensed through the position sensing module while contact of the human body is sensed through the contact sensing module.

19 Claims, 30 Drawing Sheets

(51) Int. Cl.
  *G06F 3/01* (2006.01)
  *G06F 3/0354* (2013.01)
  *G06F 3/041* (2006.01)
  *G06F 3/0488* (2013.01)

(52) U.S. Cl.
  CPC ........ *G06F 3/0488* (2013.01); *G06F 3/04883* (2013.01); *G06F 2203/04101* (2013.01)

(56) References Cited

U.S. PATENT DOCUMENTS

| | | | |
|---|---|---|---|
| 8,933,912 B2 | 1/2015 | Ambrus et al. | |
| 9,651,992 B2* | 5/2017 | Stotler | G06F 1/163 |
| 2010/0219989 A1 | 9/2010 | Asami et al. | |
| 2014/0347295 A1* | 11/2014 | Kim | G06F 1/163 345/173 |
| 2015/0061842 A1 | 3/2015 | Yoon et al. | |
| 2015/0229750 A1 | 8/2015 | Zhou et al. | |
| 2015/0261405 A1 | 9/2015 | Smith | |
| 2015/0286246 A1 | 10/2015 | Matsumoto | |
| 2015/0346851 A1* | 12/2015 | Nishihashi | G06F 3/0488 345/173 |

FOREIGN PATENT DOCUMENTS

| KR | 1020150025385 A | 3/2015 |
|---|---|---|
| KR | 1020150061420 A | 6/2015 |

OTHER PUBLICATIONS

Alex Butler, et al., "SideSight: Multi-"touch" Interaction Around Small Devices", Proceedings of the ACM Symposium on User Interface Software and Technology, Cambridge, United Kingdom, Oct. 1, 2008, 4 pages.

So Nang Gu, "My Wrist as a Smartphone Display to be Launched as early as this Winter/Circret Bracelet", http://pakyemin.blog-me/220446578144, 13 pages.

IT Observatory, "Flexible Touch Sensor", LG N_SYS Webgine, https://www.lgnsys.com/front/webzine_new/it_ivorytower.do?y=14&m-06, 2014, vol. 3, 7 pages.

* cited by examiner

ELECTRONIC DEVICE AND OPERATING METHOD THEROF

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Mar. 30, 2016, and assigned Serial No. 10-2016-0038243, the entire disclosure of which is hereby incorporated by reference.

TECHNICAL FIELD

Various exemplary embodiments of the present invention relate to an electronic device for processing an input signal based on human body communication, and an operating method thereof.

BACKGROUND

Recently, with the development of digital technologies, various types of electronic devices such as a mobile communication terminal, a smart phone, a table, a Personal Computer (PC), a Personal Digital Assistant (PDA), an electronic organizer, a notebook, a wearable device, or the like are widely used. The electronic devices have developed to a mobile convergence stage including functions of other devices. For example, the electronic devices may provide a communication function such as a voice telephony and a video telephony, a message transmission/reception function such as a Short Message Service (SMS)/Multimedia Message Service (MMS), an e-mail, or the like, an electronic organizer function, an image capturing function, a broadcast playback function, a video playback function, a music playback function, an Internet function, a messenger function, a game function, a Social Networking Service (SNS) function, or the like.

The electronic devices are designated in various forms. One of the forms may be a wearable electronic device.

SUMMARY

The wearable electronic device may be an electronic device that can be worn by a user. An input may be limited in the wearable electronic device. For example, a touch input method of the wearable electronic device may be achieved on a touch screen in which a touch panel and a display are integrated. The wearable electronic device may have a touch screen having a small screen area. Therefore, in the wearable electronic device having the small screen size, the touch input may have a device screen, and the touch input may be limited due to the small size of the screen.

To address the above-discussed deficiencies, it is an object to provide an apparatus and method for extending an input area on the basis of human communication in a wearable electronic device.

Various exemplary embodiments of the present invention may provide an apparatus and method for recognizing an input touched on a human body based on human body communication in a wearable electronic device.

Various exemplary embodiments of the present invention may provide an apparatus and method for recognizing a position of a sensed touch input when the touch input is sensed based on human body communication in a wearable electronic device.

Various exemplary embodiments of the present invention may provide an apparatus and method for recognizing a touch input and a position of the touch input based on human body communication, and for performing a function corresponding to the recognized touch input in a wearable electronic device.

According to various exemplary embodiments of the present invention, an electronic device may include a contact sensing module for sensing a human body contact of a conductive object located outside the electronic device, a position sensing module for sensing a contact position of a human body with which the conductive object is in contact from the outside of the electronic device, and a processor for displaying a graphic in a region of a display corresponding to the sensed contact position when a position of the human body is sensed through the position sensing module while the contact of the human body is sensed through the contact sensing module.

According to various exemplary embodiments of the present invention, a method of operating an electronic device may include sensing a human body contact of a conductive object located outside the electronic device, sensing a human body contact position of the conductive object located outside the electronic device, and displaying a graphic in a region of a display corresponding to the sensed human body position of the conductive object.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
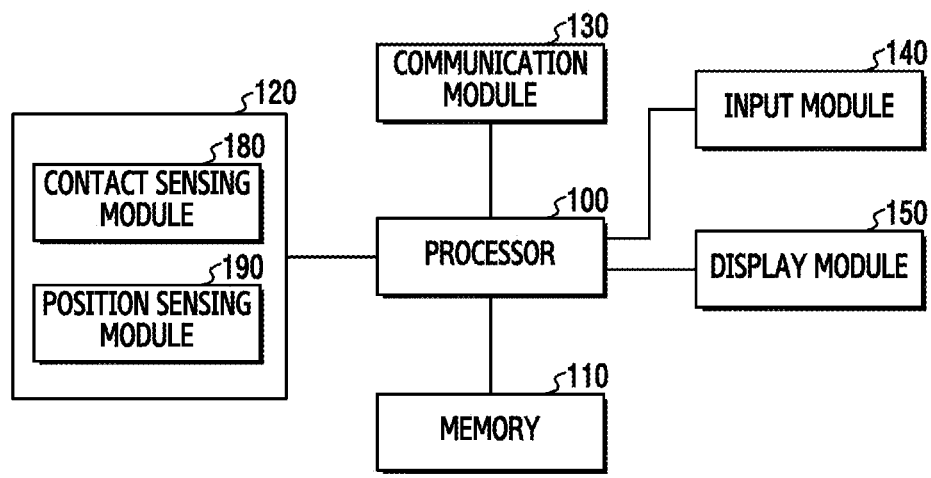
FIG. 1 illustrates a structure of an electronic device according to various exemplary embodiments of the present invention.

FIGS. 1 through 18B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Embodiments of the present disclosure are described in detail with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure.

A wearable electronic device may be an electronic device attached to a human body to perform a computing operation. The wearable electronic device may be worn in the form of glasses, a necklace, a watch, a ring, a band, or the like. A display and an input may be limited in the wearable electronic device since the device becomes compact in size. A display screen may be hidden when an input is made by a user in the wearable electronic device. Further, the wearable electronic device may also have a small input unit, which may lead to an incorrect input. The wearable electronic device may require a method in which an input can be accurately made without hiding the display screen.

The wearable electronic device may have a feature of being in contact with one part of the human body. The wearable electronic device may extend an input function through a human body function.

Human body communication may be a technique which utilizes the human body as an intermediary mediator such as an electric wire and uses it as a medium of communication by using electric current that passes through the human body without extra power consumption. Terms used in similar concept to Human body communication (HBC) may include Intra-Body Communication (IBC), Body-Coupled Communication, Off-to-On-Body Communications, Body Area Network (BAN), Body Sensor Networks, Body Channel, or the like. A primary constitutional element of the HBC technique may include contact sensing, signal analysis and data processing, electrodes, other device structures, or the like. The contact sensing may be a structure for sensing whether the human body is in contact with a transceiver device or a technique for determining whether the human body is in contact with the transceiver device. The signal analysis and data processing may include a data transmitter, a data receiver, and a converter for converting a signal to an analog or digital signal. The electrode may be an electrode for transmitting a signal in the human body and an electrode for receiving a signal which passes through the human body.

The HBC technique may use an electric current method, an electric field method, or the like. The electric current method may be a method of using a change in electric current that flows inside the human body. It may be a method of sensing a change in minute electric current by bringing the electrode of the electronic device in contact with the human body. For example, the electronic current that flows through the human body may be about up to 500 uA, and may have negligible effect on health. The electric field method may be a method of using a change in an electric field on a surface of the human body. It may be a method of detecting the change in the electric field on the surface of the human body when voltage is applied to the human body in contact with an insulator from a transmitter of the electronic device.

In various exemplary embodiments of the present invention described below, the wearable electronic device may be included in a category of the aforementioned electronic device, and an interworking operation between the electronic devices may also operate in the wearable electronic device and various electronic devices. For example, in various exemplary embodiments of the present invention, the wearable electronic device may include any information communication device, multimedia device, and wearable device supporting a function according to the various exemplary embodiments of the present invention and an application device thereof, that is, any device using one or more of various processors (e.g., processor 100 in FIG. 1) such as an Application Processor (AP), a Communication Processor (CP), a Graphics Processing Unit (GPU), a Central Processing Unit (CPU), or the like. The flexible device may be a bendable electronic device, and the wearable electronic device may imply an electronic device that can be worn by the user. The electronic device according to various exemplary embodiments of the present invention may be an electronic device which is flexible and wearable.

In addition, the wearable electronic device may perform an operation in which, in a state of being connected to another electronic device, a function corresponding to the device is performed between the electronic device and the wearable device according to whether the device is connected to the electronic device.

Hereinafter, an electronic device according to various exemplary embodiments of the present invention will be described by taking an example of using an electric current method.

FIG. 1 illustrates a structure of an electronic device according to various exemplary embodiments of the present invention. The electronic device of FIG. 1 may be a wearable electronic device. In addition, the wearable electronic device may be a flexible electronic device.

Referring to FIG. 1, the electronic device may include a processor 100, a memory 110, a sensor module 120, a communication module 130, an input module 140, and a display module 150. In a certain exemplary embodiment, the electronic device may omit at least one of constitutional elements or may additionally include other constitutional elements.

In the electronic device of FIG. 1, the input module 140 and the display module 150 may be a flexible device, and may be an integrated touch screen (or a touch screen sensor). In the electronic device of FIG. 1, all or some constitutional elements of the processor 100, memory 110, sensor module 120, and/or communication module 130 may be constructed of one or at least two flexible Printed Circuit Boards (PCBs). The flexible PCB may be curved, bended, rolled, or folded together with the flexible screen sensor.

The processor 100 may include one or more of a Central Processing Unit (CPU), an Application Processor (AP), and a Communication Processor (CP). The processor 100 may control, for example, at least one of other constitutional elements of the electronic device and/or may execute an arithmetic operation or data processing for communication.

The memory 110 may include a volatile and/or non-volatile memory. The memory 110 may store a command or data related to at least one different constitutional element of the electronic device. The memory 110 may store a software and/or a program. The program may include a kernel, a middleware, an Application Programming Interface (API), and/or an application program (or an "application"), or the like. At least some parts of the kernel, middleware, or API may be referred to as an Operating System (OS).

The sensor module 120 may measure physical quantity or detect an operational status of the electronic device, and may convert the measured or detected information into an electric signal. According to various exemplary embodiments of the present invention, the sensor module 120 may include a contact sensing module 180 for sensing a human body contact (or touch) and/or a position sensing module 190 for sensing a position at which a human body is in contact through human body communications. The contact sensing module 180 may sense a human body contact on the basis of the electric current method or the electric field method. According to various exemplary embodiments of the present invention, the contact sensing module 180 will be described by taking an example of sensing the human body contact of a user on the basis of the electric current method. The position sensing module 190 may sense a human body contact position of the user. The position sensing module may sense the contact position on the basis of an infrared method, a laser method, an ultrasound method, or the like. Various exemplary embodiments of the present invention will be described by taking an example of sensing the contact position on the basis of the infrared method.

The sensor module 120 may further include other sensors in addition to the contact sensing module 180 and the position sensing module 190. For example, the sensor module 120 may further include at least one of a gesture sensor, a gyro sensor, a pressure sensor, a magnetic sensor, an acceleration sensor, a grip sensor, a proximity sensor, a color sensor (e.g., a Red, Green, Blue (RGB) sensor), a medical sensor, a temperature-humidity sensor, an illumination sensor, and an Ultra Violet (UV) sensor.

According to various exemplary embodiments of the present invention, the sensor module 120 may include a bending sensor for sensing the flexing or bending of the electronic device when the display is a flexible display.

Additionally or alternatively, the sensor module 120 may further include a control circuit for controlling at least one or more sensors included therein. In a certain exemplary embodiment, the electronic device may further include a processor configured to control the sensor module 120 either separately or as a part of the processor 100, and may control the sensor module 120 while the processor 100 is in a sleep state.

The communication module 130 may include a wireless communication module and a wired communication module. The wireless communication module may include a cellular communication module and a short-range communication module.

The cellular communication module may use at least one of Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like. The cellular communication module may provide a voice call, a video call, a text service, an Internet service, or the like, for example, through a communication network. According to one exemplary embodiment, the cellular communication module may identify and authenticate the electronic device in the communication network by using a subscriber identity module (e.g., a SIM card). According to one exemplary embodiment, the cellular communication module may perform at least some functions that can be provided by the processor 100. According to one exemplary embodiment, the cellular communication module may include a Communication Processor (CP).

The short-range communication module may include at least one of Wireless Fidelity (WiFi), Bluetooth, Near Field Communication (NFC), or a Global Navigation Satellite System (GNSS), a Global Positioning System (GPS), and the like. MST may use an electromagnetic signal to generate a pulse according to transmission data, and the pulse may generate a magnetic field signal. The electronic device may transmit the magnetic field signal to Point of Sales (POS), and the POS may use an MST reader to detect the magnetic field signal, and may convert the detected magnetic field signal into an electronic signal to restore data. According to a usage region or a bandwidth or the like, the GNSS may include, for example, at least one of Global Positioning System (GPS), Global Navigation Satellite System (Glonass), Beidou Navigation Satellite System (hereinafter, "Beidou"), Galileo, the European global satellite-based navigation system, and the like. Hereinafter, the "GPS" and the "GNSS" may be interchangeably used.

The wired communication may include, for example, at least one of Universal Serial Bus (USB), High Definition Multimedia Interface (HDMI), Recommended Standard-232 (RS-232), Plain Old Telephone Service (POTS), and the like.

The input module 140 may include at least one input unit among a touch panel, a (digital) pen sensor, a key, and an ultrasonic input unit. The touch panel may use at least one type among an electrostatic type, a pressure-sensitive type, an infrared type, and an ultrasonic type. In addition, the touch panel may further include a control circuit. The touch penal may further include a tactile layer to provide the user with a tactile reaction. The (digital) pen sensor may be one part of a touch panel, or may include an additional sheet for recognition. The key may include a physical button, an optical key, or a keypad. The ultrasonic input unit may detect an ultrasonic wave generated in an input means through a microphone, and may confirm data corresponding to the detected ultrasonic wave. According to various exemplary embodiments of the present invention, the input unit may be the touch panel, and the touch panel may include a pressure sensor function.

The display module 150 may be a Liquid Crystal Display (LCD), a Light-Emitting Diode (LED) display, an Organic Light-Emitting Diode (OLED) display, a MicroElectroMechanical Systems (MEMS) display, or an electronic paper display. The display module 150 may display various screens (e.g., text, image, video, icon, symbol, etc.) to the user.

Each of the input module 140 and the display module 150 may be constructed of an integrated touch screen. The touch screen may display a screen under the control of the processor 100, and may detect a touch, gesture, proximity, or hovering input by using an electronic pen or one part of the human body of the user.

In various exemplary embodiments of the present invention, the electronic device may be a wearable electronic device, and the input unit 150 and display 160 may be flexible devices. In various exemplary embodiments of the present invention, the electronic device may be a wearable electronic device, and the input unit 150 and display 160 may be non-flexible devices.

In various exemplary embodiments of the present invention described below, the wearable electronic device may be included in a category of the aforementioned electronic device, and an interworking operation between the electronic device may also operate in the wearable electronic device and various electronic devices. For example, in various exemplary embodiments of the present invention, the wearable electronic device may include any information communication device, multimedia device, and wearable device supporting a function according to the various exemplary embodiments of the present invention and an application device thereof, that is, any device using one or more of various processors (e.g., processor 100) such as an Application Processor (AP), a Communication Processor (CP), a Graphics Processing Unit (GPU), a Central Processing Unit (CPU), or the like.

The flexible device may be a bendable electronic device, and the wearable electronic device may imply an electronic device that can be worn by the user. The electronic device according to various exemplary embodiments of the present invention may be an electronic device which is flexible and wearable. The flexible electronic device and the wearable electronic device will be used in the same meaning in the following description.

In addition, the wearable electronic device may perform an operation in which, in a state of being connected to another electronic device, a function corresponding to the device is performed between the electronic device and the wearable device according to whether the device is connected to the electronic device.

The processor 100 may use the memory 110 to control an execution of an application. The application (e.g., an application program) may include one or more applications capable of performing a function for providing, for example, a home, a dialer, a Short Message Service (SMS)/Multimedia Messaging Service (MMS), an Instant Message (IM), a browser, a camera, an alarm, a contact, a voice dial, an e-mail, a calendar, a media player, an album, a watch, a health care (e.g., measuring of a physical activity level, a blood sugar level, etc.), environment information (e.g., atmospheric pressure, humidity, or temperature information), or the like.

Figure 2A:
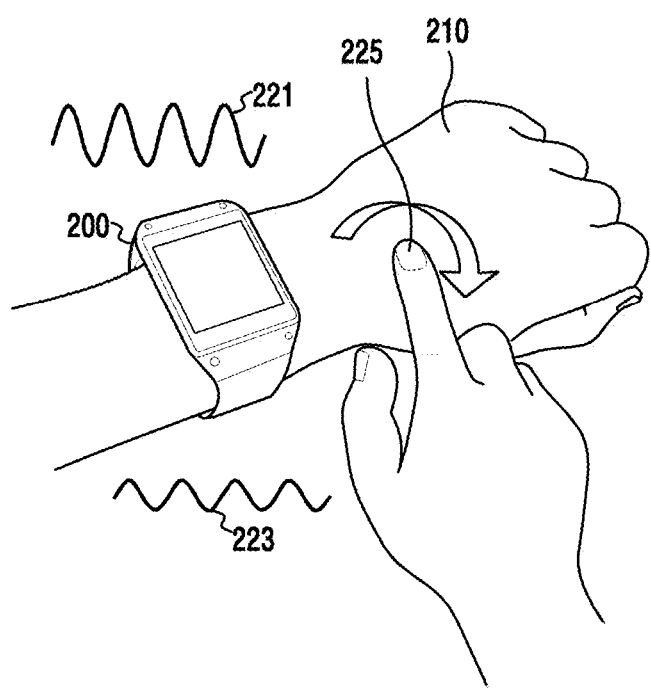
FIG. 2A and FIG. 2B illustrate an example of operating a wearable electronic device according to various exemplary embodiments of the present invention.
Figure 2B:
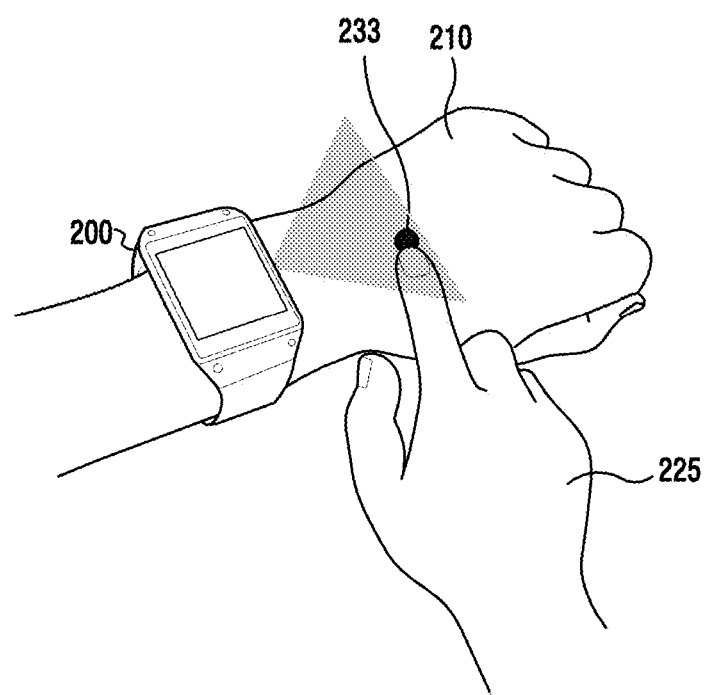

FIG. 2A and FIG. 2B illustrate an example of operating a wearable electronic device according to various exemplary embodiments of the present invention.

An example of a watch-type wearable electronic device is shown in FIG. 2A and FIG. 2B. The wearable electronic device may be a small-sized electronic device that can be firmly attached to skin or the like. According to various exemplary embodiments of the present invention, the wearable electronic device may recognize a conductive object when the conductive object (for example, a finger, a pen, or the like) is brought into contact with the same surface (e.g., skin) of a device firmly attached to a human body in a close distance. In the following description, an object may be the conductive object. In addition, according to various exemplary embodiments of the present invention, the wearable electronic device may sense a user position (a position of a human body with which the conductive object is in contact) on the conductive object located outside the electronic device upon sensing the contact of the conductive object with the human body. The wearable electronic device may have the form of a watch, a ring, a necklace, a band, clothes, or the like.

Referring to FIG. 2A, a wearable electronic device 200 may transmit a signal 221 for sensing a contact on a human body 210. The signal 221 may be transmitted by the contact sensing module 180. The processor 100 may control the contact sensing module 180 of the sensor module 120 to transmit the signal 221 to the human body. The signal 221 may be an electric signal that cannot be sensed by a person. The contact sensing module 180 may transmit the signal 221 to the human body 210 located outside the electronic device, and may receive a signal transmitted through the human body 210. In this case, if a user is not in contact with the human body 210, the contact sensing module 180 may receive the signal 221. When the user is in contact with the human body 210 together with an object 225 (e.g., a finger contact), the signal 221 may be changed to a signal 223 by forming a path of electric current through the object 225 in contact. Then, the contact sensing module 1800 may sense that the signal 221 transmitted to the human body 210 is changed to the signal 223 by forming the electric current path of the object 225 due to the contact of the object 225. For example, the processor 100 may control the contact sensing module 180 to transmit the signal 223 and analyze a level of the received signal (e.g., a signal size, a signal strength, a waveform cycle, etc.), and may recognize that the contact does not occur if the analysis result shows that the received signal has the same level as the transmitted signal 233, and may recognize that the contact occurs if the received signal is changed similarly to the signal 223.

Referring to FIG. 2B, when the processor 100 senses a contact of the object 225 of the human body 210 through the contact sensing module 180 of the sensor module 120, the processor 100 may recognize the contact position 233 of the object 225 through the position sensing module 190. In one exemplary embodiment, upon sensing the contact through the contact sensing module 180, the processor 100 may sense the contact position by activating the position sensing module 190. The position sensing module 190 may include a sensor for sensing the contact position of the object 225. The sensor of the position sensing module 190 may use infrared, laser, or ultrasonic types. In one exemplary embodiment, the position sensing module 190 may use an infrared-type sensor. For example, the infrared sensor may include at least one light emitting element and a light receiving element array. When the contact is sensed, the position sensing module 190 may transmit a signal 231 for sensing a contact position 233 of the object 225 under the control of the processor 100, and may analyze the received signal to recognize the contact position 233 of the object 225. For example, if the position sensing module 190 is an infrared-type module, the position sensing module 190 may activate the light emitting element to output an optical signal such as the signal 231 and receive optical signals reflected by the object 233 through the light receiving element array. The processor 100 may analyze signals sensed by the light receiving element array of the position sensing module 190 to estimate the contact position 223 by estimating reception strength of a light receiving element for receiving reflected light with great strength.

A transmitter (e.g., the light emitting element) of the position sensing module 190 may transmit a signal in a first direction of the wearable electronic device in which a first region of the human body is located, and a receiver (e.g., the light receiving element array) may receive a signal reflected by an object (a conductive object, for example, a finger, a pen, etc.) to be in contact with the first region of the human body. For example, if the wearable electronic device is a watch type to be worn on a wrist, the first region of the human body may correspond to a direction of a back of the hand (or a palm direction) with respect to the wearable electronic device worn thereon, and a second region of the human body may correspond to a forearm direction with respect to the wearable electronic device.

The processor 100 may be configured such that the position sensing module 190 can recognize a contact position when a contact of an object is sensed in the contact sensing module 180. Upon sensing a position of a conductive object located outside the electronic device, the processor 100 may determine that the object is in contact in the first region of the human body. If the contact position of the conductive object cannot be recognized, the processor 100 may determine that the object is in contact with the second region of the human body. If it is determined as the contact in the second region of the human body, the processor 100 may switch a currently running application to a background application and may execute and display a configuration application. The configuration application may be a specific application such as a watch application or the like for displaying a current time, or may be an application or the like for displaying a home screen. If the contact in the second region is recognized while executing the configuration application, the processor 100 may end the execution of the configuration application and may execute again the previous application switched to the background application.

In one exemplary embodiment, the electronic device may activate the position sensing module 190 upon sensing that the conductive object located outside the electronic device is in contact with the human body through the contact sensing module 180. For example, in order to reduce battery consumption in the electronic device, upon sensing the contact of the conductive object, the electronic device may drive the position sensing module 190 to perform an operation of sensing a position of the human body with which the conductive object is in contact.

As shown in FIG. 2A and FIG. 2B, the wearable electronic device 200 may be firmly attached to the skin or the like, and may sense a contact on the human body around the wearable electronic device 200. In one exemplary embodiment, the wearable electronic device 200 may be firmly attached to the human body (e.g., the skin), and may recognize this when the object is brought in contact with the same surface in a close distance. In one exemplary embodiment, when the wearable electronic device 200 recognizes that the object is in contact with the human body, the wearable electronic device 200 may recognize a position at which the object is in contact.

Figure 3:
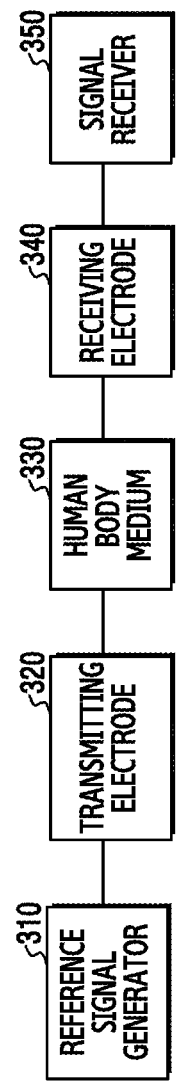
FIG. 3 illustrates a structure of a contact sensing module in a wearable electronic device according to various exemplary embodiments of the present invention.

FIG. 3 illustrates a structure of a contact sensing module in a wearable electronic device according to various exemplary embodiments of the present invention.

Referring to FIG. 3, a reference signal generator 310 may output an electric signal. The electric signal may have a weak current magnitude that does not have an effect on a human body. Electric current output from the reference signal generator 310 may be several hundreds of $\mu A$ (e.g., up to 500 $\mu A$ or less). A transmitting electrode 320 and a receiving electrode 340 may be in contact with a human body medium 330. The transmitting electrode 320 may deliver the electric signal output from the reference signal generator 310 to the human body medium 330. The receiving electrode 340 may sense electric current of a reference signal that passes through the human body 330. A signal receiver 350 may convert a signal sensed by the receiving electrode 340 into digital data. The signal receiver 350 may include an amplifier for amplifying a micro current signal and an element (e.g., a comparator, etc.) for converting the amplified signal into a digital signal. For example, the signal receiver 350 may convert an analog pulse signal into a digital pulse signal.

The processor 100 may analyze a magnitude of a signal output from the signal receiver 350 to determine whether a contact occurs. For example, the processor 100 may determine that an object is not in contact with the human body 330 if the magnitude of the received signal is equal to the signal magnitude of the reference signal generator 310 or has a magnitude within a permitted range. For example, the processor 100 may determine that the object is in contact with the human body medium 330 if the magnitude of the received signal is less than the signal magnitude of the reference signal generator 310.

Figure 4:
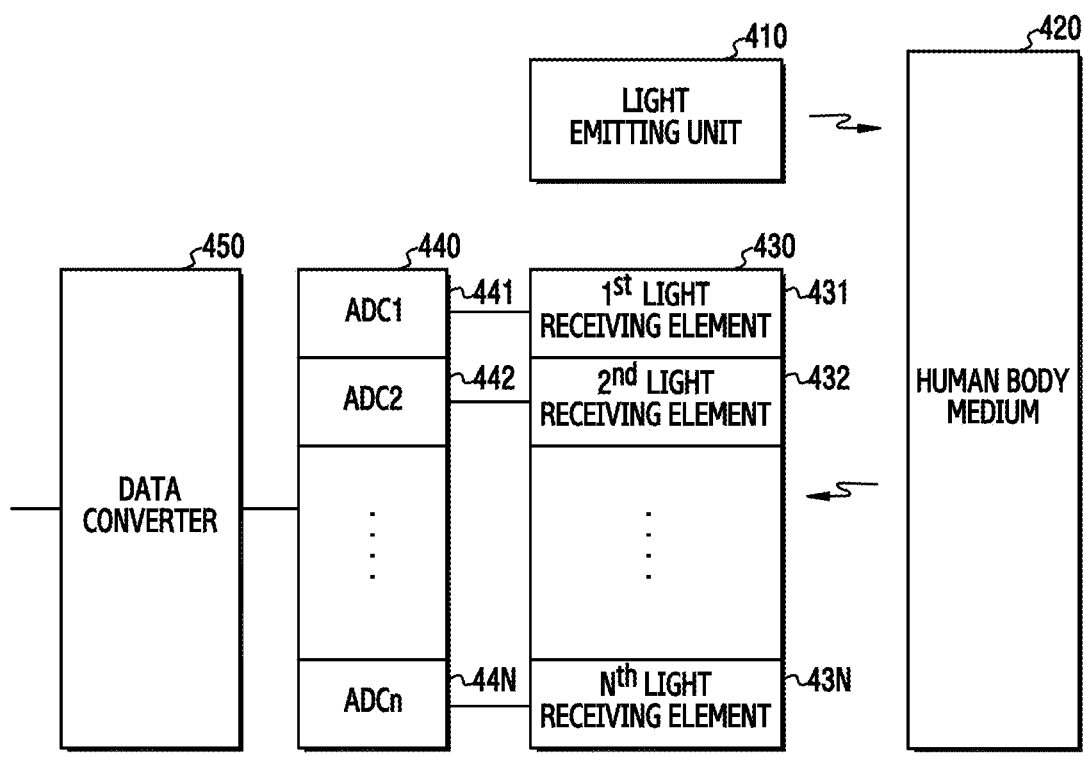
FIG. 4 illustrates a structure of a position sensing module in a wearable electronic device according to various exemplary embodiments of the present invention.

FIG. 4 illustrates a structure of a position sensing module in a wearable electronic device according to various exemplary embodiments of the present invention.

Referring to FIG. 4, the processor 100 may drive a light emitting unit 410 to irradiate light toward a human body medium 420. The light emitting unit 410 may include at least one light emitting element, and light emitted from the light emitting element may be irradiated to the human body medium 420 in a radial form. A light receiving unit 430 may have an array structure comprising N light receiving elements 431 to 43N. The light receiving unit 430 may receive an optical signal reflected from an object in contact with the human body medium 420 and convert it into an electric signal. In the received signal, the signal reflected from the object in contact may have a greatest magnitude. A converter 440 may include Analog to Digital Converters (ADCs) 441 to 44N corresponding to the number of the light receiving elements 431 to 43N. The ADCs 441 to 44N of the converter 440 may convert signals received from the light receiving elements 431 to 43N corresponding to the light emitting unit 430. A data converter 450 may convert each light receiving element's digital data converted by the convert 440 and may output the converted data to the processor 100. The data converter 450 may be a parallel-to-serial converter for converting parallel digital data related to each of light emitting signals output from the converter 440 into signal digital data.

The processor 100 may determine a row position (a horizontal position of a human body medium, a value X) of the object recognized as being in contact by confirming a light emitting element having greatest signal strength among data output from the position sensing module 190, and may determine a column position (a vertical position of the human body medium, a value Y) of an object which is recognized as being in contact by analyzing strength of the received signal.

FIG. 5A to FIG. 5D illustrate an operation in which a wearable electronic device senses a contact of a conductive object according to various exemplary embodiments of the present invention.

Figure 5A:
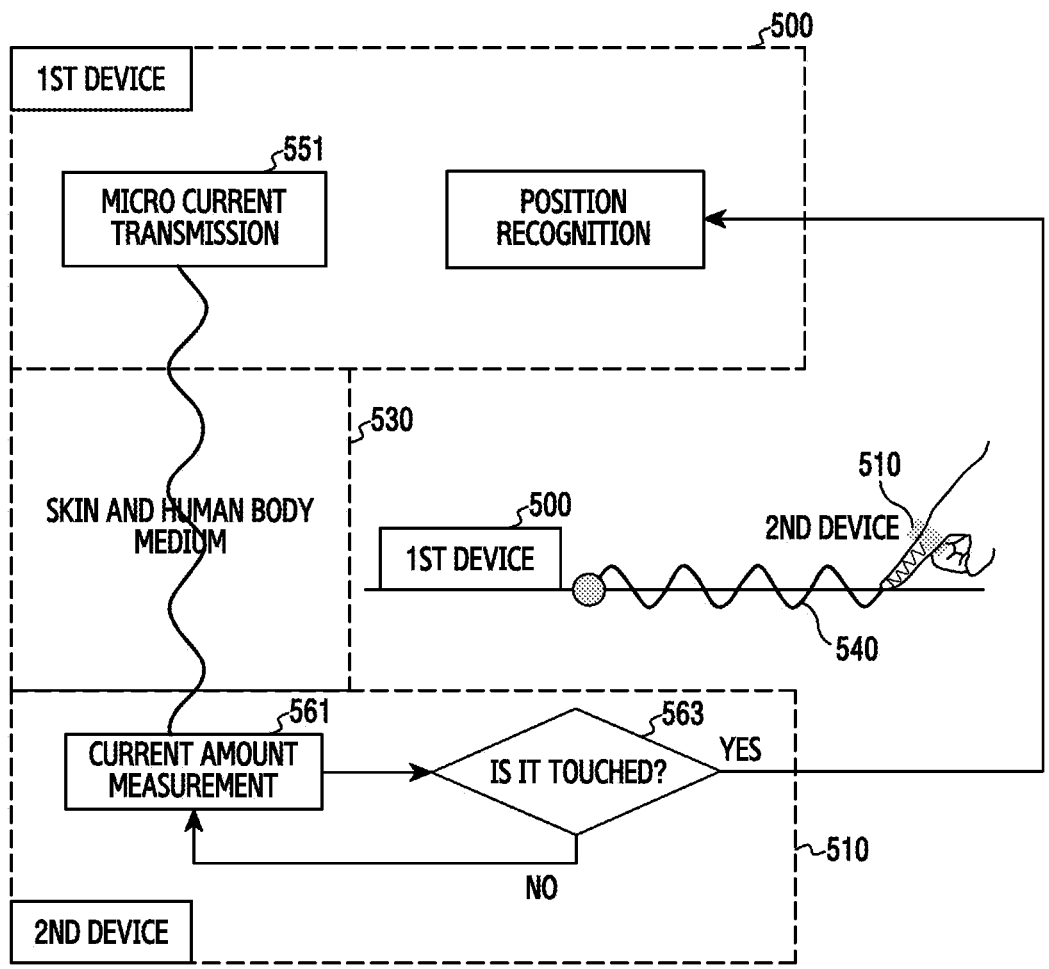
FIG. 5A to FIG. 5D illustrate an operation in which a wearable electronic device senses a contact of a conductive object according to various exemplary embodiments of the present invention.

Referring to FIG. 5A, a first device 500 may be a wearable electronic device having the structure of FIG. 1, and a second device 510 may be another wearable electronic device for sensing a contact. The first device 500 may include the contact sensing module 180 and the position sensing module 190. In order to determine whether an external stimulus signal (e.g., a signal for sensing an object to be in contact with a human body medium 530) is generated, the first device 500 may transmit micro current through the contact sensing module 180 in step 551. The micro current transmitted from the contact sensing module 180 of the first device 500 may be propagated through the human body medium 530.

Figure 5B:
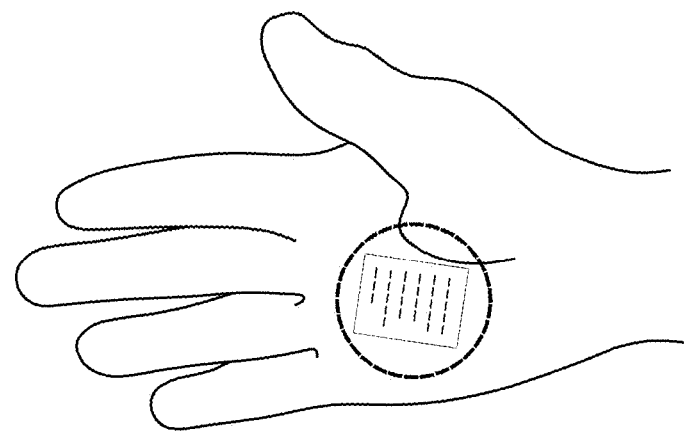
Figure 5C:
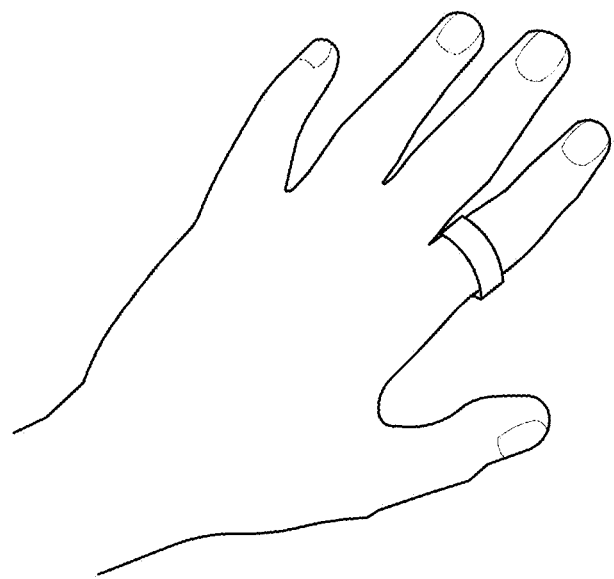
Figure 5D:
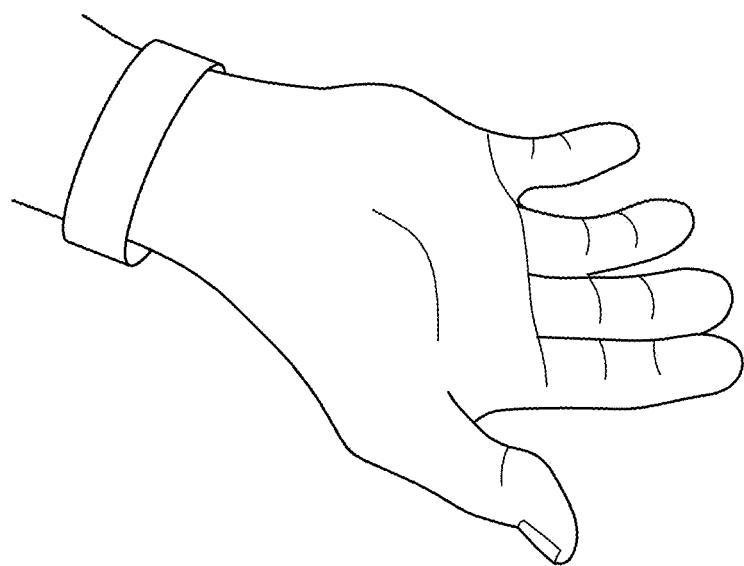

The second device 510 may be placed on an object to be in contact with the human body medium 530. The human body medium 530 may be skin. The contact object may be a part of a human body (e.g., a finger, an arm, a palm, etc.) or another device (e.g., a pen, etc.). The second device 510 may be placed on the contact object. For example, the second device 510 may be a skin-attached type object as shown in FIG. 5B. The skin-attached type object may include a skin-attached sensor and circuit. The skin-attached type object of FIG. 5B may be attached to a hidden part (e.g., a palm or the like) of the human body, and may be attached to an object that can be firmly attached to skin, such as an inner part of a belt of trousers or an inner part of clothes or the like. For example, the second device 510 may be a ring-shaped object as shown in FIG. 5C. For example, the second device 510 may be a bracelet-shaped object as shown in FIG. 5D. The ring or bracelet-shaped object may be a universal type device, and may be a device that can be worn easily.

The second device 510 may include the receiving electrode 340 and the signal receiver 350 in the structure of the contact sensing module 180 of FIG. 3, and may include a structure of a transmitter for transmitting a contact sensing signal to the first device 500. In step 561, the second device 510 may measure an amount of electric current received through the human body medium 530 to determine whether a contact occurs. Upon recognizing the contact, in step 563, the second device 510 may recognize that an object 640 is in contact with the human body, and may notify the contact with the first device 510 through the transmitter. The transmitter may be a short-range wireless communication unit (e.g., Bluetooth, WiFi, NFC, etc.).

The first device 500 may include the reference signal generator 310 and the transmitting electrode 320 in the structure of the contact sensing module 180 of FIG. 3. The first device 500 may include a short-range wireless communication unit (e.g., Bluetooth, Wi-Fi, NFC, etc.) capable of receiving a signal transmitted from the second device 510. Upon receiving the contact sensing signal from the second device 510, the first device 500 may activate the position sensing module 190 to recognize a position of an object in contact.

As shown in FIG. 5A, the wearable electronic device may include the first device 500 and the second device 510. The second device 501 may be firmly attached to the skin by using a skin-attached type sensor or the like or may be placed to an inner portion of clothes firmly attached to the skin. Further, the second device 501 may also be a device that can be worn on the human body as shown in FIG. 5C and FIG. 5D. By using the first device 510 and the second device 520, an electric current signal generated by the first device 500 may be sensed by the second device 520. In this case, when the second device 510 is in contact with the human body medium 530, micro current transmitted from the first device 510 may be received through the human body medium 530, and when the micro current is sensed, the second device 510 may recognize that it is in contact with the human body medium 530 and may transmit a contact sensing signal to the first device 510.

Figure 6:
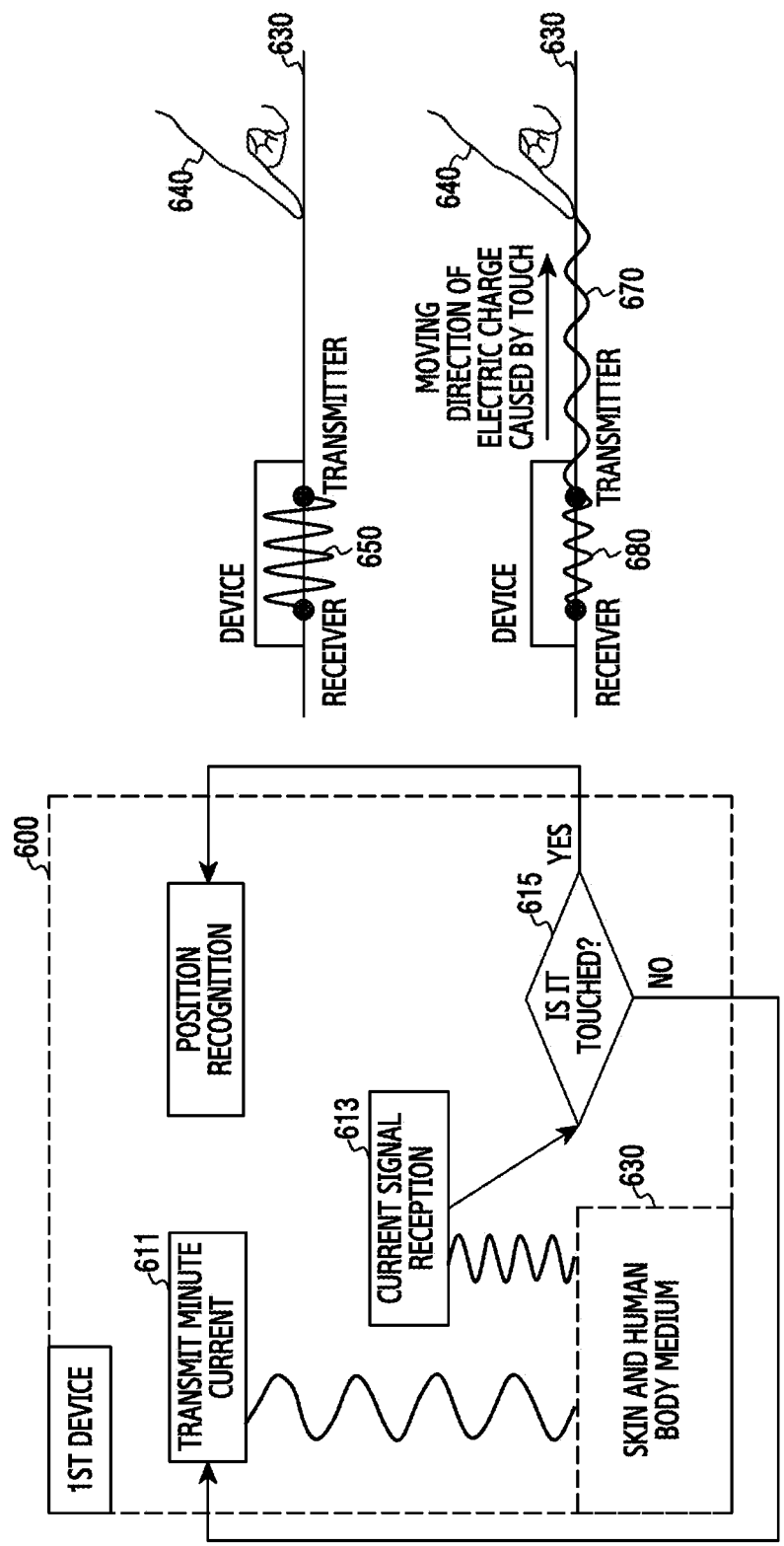
FIG. 6 illustrates another operation in which a wearable electronic device senses a contact of a conductive object according to various exemplary embodiments of the present invention.

FIG. 6 illustrates another operation in which a wearable electronic device senses a contact of a conductive object according to various exemplary embodiments of the present invention.

Referring to FIG. 6, a wearable electronic device 600 may have the structure of FIG. 1. In step 611, the wearable electronic device 600 may transmit micro current 650 to a human body medium 630 through the contact sensing module 180. The micro current 650 may be delivered to the contact sensing module 180 through the human body medium 630. In this case, if an object 640 (e.g., a finger, a pen, etc.) is not in contact with the human body medium 630, the contact sensing module 180 may directly receive the micro current 650. A transmitter of the contact sensing module 180 may include the reference signal generator 310 and the transmitting electrode 320, and a receiver may include the receiving electrode 340 and the signal receiver 350.

The wearable electronic device 600 may receive a current signal through the human body medium 630 in step 613, and may analyze a magnitude of the micro current to determine whether a contact occurs in step 615. If the object 640 is not in contact with the human body medium 630, the receiver of the contact sensing module 180 may directly receive the micro current 650 transmitted from the transmitter. The wearable electronic device 600 may analyze a signal of the receiver, and if it is equal to a magnitude of the micro current 250 transmitted from the transmitter or has a current magnitude within a permitted range, may determine that the object 640 is not in contact with the human body medium 630.

However, when the object 640 is in contact with the human body medium 630, an electric current loop may be formed in a direction of the object 640 in contact, so that a part of the minute current output from the transmitter of the contact sensing module 180 flows as indicated by a reference numeral 670 in the direction of the object 640 in contact. Accordingly, a part of the micro current output from the transmitter of the contact sensing module 180 flows in the direction of the object 640 as indicated by the reference numeral 670, so that the receiver of the contact sensing module 180 can sense electric current as indicated by a reference numeral 680. The wearable electronic device 600 may determine that the object 640 is in contact with the human body medium 630 when electric current output from the transmitter as indicated by the reference numeral 650 is decreased as indicated by the reference numeral 680.

Figure 7:
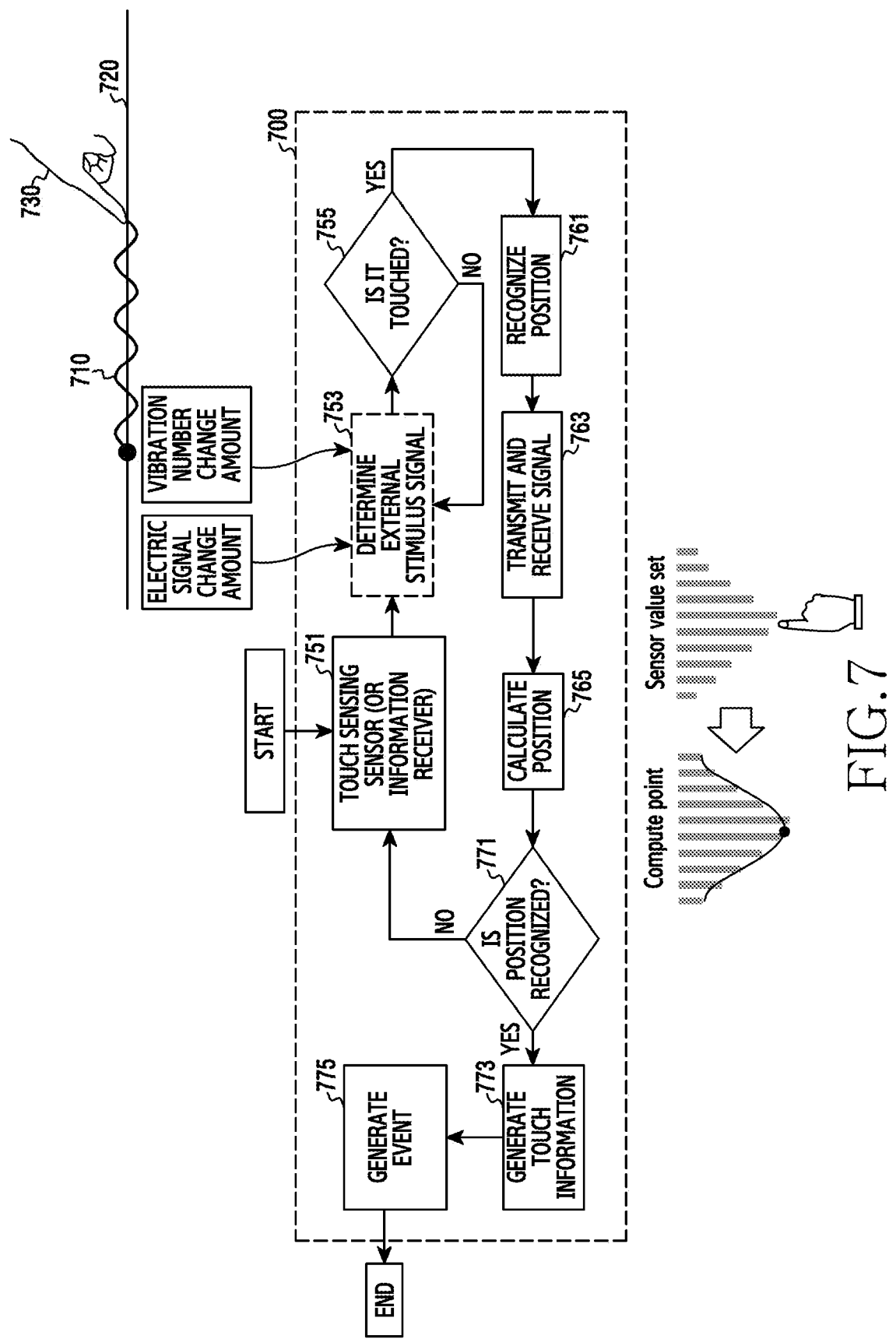
FIG. 7 illustrates an operation in which a wearable electronic device determines a contact position of an object according to various exemplary embodiments of the present invention.
Figure 8A:
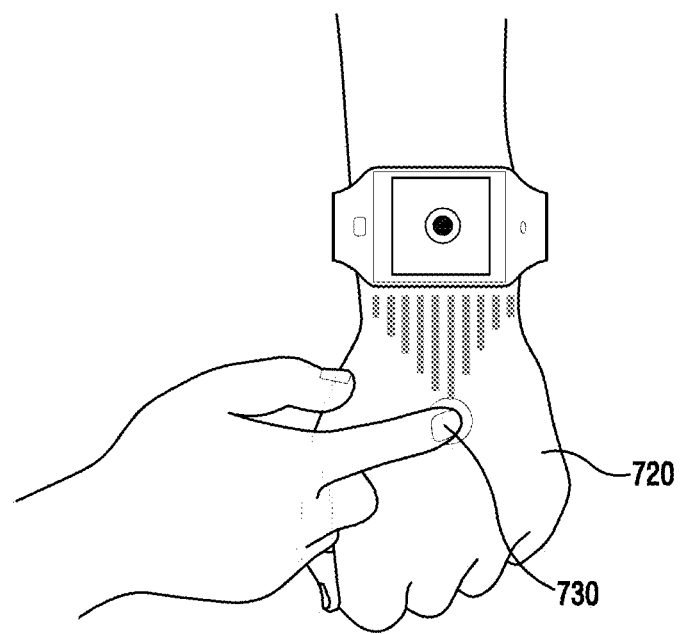
FIG. 8A and FIG. 8B illustrate an example in which a wearable electronic device determines a position.
Figure 8B:
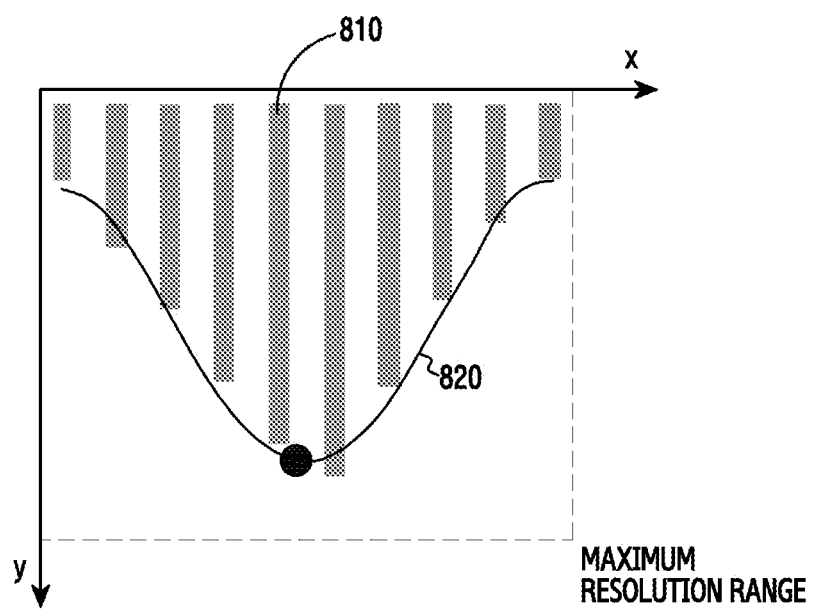

FIG. 7 illustrates an operation in which a wearable electronic device determines a contact position of an object according to various exemplary embodiments of the present invention. FIG. 8A and FIG. 8B illustrate an example in which a wearable electronic device determines a position.

Referring to FIG. 7, in step 751, a wearable electronic device 700 may transmit micro current 710 to a human body medium 720 through the contact sensing module 180. In step 753, the wearable electronic device 700 may receive a current signal delivered through the human body medium 720 in step 753. As described in FIG. 5A and FIG. 6, the wearable electronic device 700 may receive a current signal having a different magnitude depending on whether the object 730 is in contact. For example, when the object 730 is in contact with the human body medium 720, there may be a change in the micro current transmitted from the contact sensing module 180. The change in the micro current may be sensed by a change amount of the electric signal or a change amount of a vibration value. In step 755, the wearable electronic device 700 may analyze a magnitude of received current to determine whether the object 730 is in contact. If it is determined that the object 730 is not in contact with the human body medium 720, in step 755, the wearable electronic device 700 may perform an operation of recognizing this and analyzing the electric current signal received through the contact sensing module 180.

If it is determined in step 755 that the contact occurs, in step 761, the wearable electronic device 700 may recognize a position of a human body with which the object is in contact through the position sensing module 190. The position sensing module 190 may output a signal (e.g., irradiate an optical signal) for sensing a position of the object 730 in contact in a direction of the human body medium 720. In step 763, the wearable electronic device 700 may receive the optical signal reflected from the object 730 through the position sensing module 190. The object 730 may be in contact with the human body from the outside of the electronic device. In step 765, the wearable electronic device 700 may calculate a position and signal strength of the received signal to recognize the position of the object 730 which is in contact with the human body from the outside of the electronic device. For example, if the object 730 is not in contact with the human body medium 720, the position sensing module 190 may not be able to receive the reflected optical signal.

As shown in FIG. 8A, if the object 730 is in contact with the human body medium 720, the optical signal irradiated by the position sensing module 190 may be reflected by the object 730 and received by the position sensing module 190. The position sensing module 190 may analyze strength of received signals to recognize a contact position of the object 730. For example, the position sensing module 190 may be constructed of at least one light emitting element and a plurality of light receiving element arrays as shown in FIG. 4. The light receiving elements of the position sensing module 190 having the structure of FIG. 4 may receive an optical signal as indicated by a reference number 810 of FIG. 8B according to the position of the object 730. An envelope 820 of the received optical signal may have the form of a quadratic function. In step 765, the wearable electronic device 700 may calculate strength of the received light signal and the light receiving element for receiving an optical signal having a maximum value to determine the position of the object 730 in contact with the human body. The wearable electronic device 700 may set a position of the light receiving element for receiving the optical signal having the maximum value to a low position (a value x), and may set the maximum value of the received optical signal to a column position (a value y).

After the contact position of the object 730 in contact with the human body outside the electronic device is calculated in step 765, the wearable electronic device 700 may confirm whether the position of the human body with which a conductive object is in contact is a valid position in step 771, and if it is the valid position, may generate position information in step 773. Thereafter, the wearable electronic device 700 may execute an event based on the generated position information.

The wearable electronic device 700 may be firmly attached to the human body medium 720 (e.g., skin, etc.) to periodically transmit a weak electric signal by using a firmly attached portion. An electric signal receiver (a main element of transmitting an electric signal, or another receiver) may continuously measure a change amount of the electric signal. In this case, if the object 730 (e.g., a finger) which is a conductor is in contact with a specific space of the human body medium 720, the wearable electronic device 700 may sense a change in the electric signal, and if the change in the electric signal is sensed, may recognize a contact (e.g., a touch) of the object 730. Upon sensing the contact of the object 730, the wearable electronic device 700 may estimate a position of the human body with which the object 730 is in contact through the position sensing module 190 (e.g., a radial sensor (ultrasonic waves, radial infrared rays, etc.)), and may determine the estimated position as a final touch signal.

The calculating of the position of the object 730 in contact may use a position sensing module (e.g., a signal radial sensor (an infrared sensor, an ultrasonic sensor, etc.) having at least one transmitting element and a plurality of receiving elements), and may calculate a contact position of the object 730 by using signals received from the plurality of receiving elements. In a method of calculating the contact position, when a signal is transmitted by a transmitting element, the signal may be applied to receiving elements by being reflected from the object 730. Regarding a magnitude of the signal received by a plurality of receiving elements, a signal having the greatest magnitude may be received in a light receiving element located in a direction facing the object 730, and signals whose magnitudes are decreased may be received in light receiving elements located in both directions with respect to the light receiving element. In this case, the received signals may have the form of a quadratic function, and may create a coordinate (x,y) with a maximum value point of the function by fitting with the quadratic function. This method may freely adjust the number of receiving elements and a desired resolution.

According to various exemplary embodiments of the present invention, an electronic device may include a contact sensing module for sensing a human body contact of a conductive object located outside the electronic device, a position sensing module for sensing a contact position of a human body with which the conductive object is in contact from the outside of the electronic device, and a processor for displaying a graphic in a region of a display corresponding to the sensed contact position when a position of the human body is sensed through the position sensing module while the contact of the human body is sensed through the contact sensing module.

The contact sensing module may include a transmitter for transmitting a signal to the human body outside the electronic device, and a receiver for receiving the signal, which is changed depending on whether the conductive object is in contact with the human body, through the human body. The processor may recognize whether the conductive object is in contact with the human body on the basis of a change in the signal received by the receiver.

The electronic device may further include a second electronic device. The contact sensing module may include a transmitter for transmitting a signal to the human body outside the electronic device, and a wireless receiver for receiving a signal transmitted from the second electronic device. The second electronic device may include a receiver for receiving a change in a signal transmitted from the transmitter through the human body when the conductive object is in contact with the human body, and a wireless transmitter for transmitting to the electronic device a signal received from the receiver.

The position sensing module may include a transmitter for transmitting a signal in a direction of the human body, a receiver including at least two receiving elements to receive a signal reflected from the conductive object in contact with the human body from the outside of the electronic device. The processor may recognize a contact position of the conductive object on the basis of a position and reception signal strength of the receiving elements for receiving the signal from the receiver.

The position sensing module may transmit a signal in a direction of a first region of the human body. The processor may recognize an object contact position of the first region of the human body through the position sensing module if the human body contact is sensed through the contact module, and if the contact position is not recognized in the first region of the human body, may recognize this as a contact of a second region of the human body and may display a determined application on a display.

The processor may be configured for switching a running application to a background upon sensing the contact of the second region, and displaying the determined application on the display, and if the contact of the second region of the human body is recognized in a state of displaying the determined application, ending the displaying of the determined application, and displaying the previous application switched to the background.

The processor may be configured for executing a character recognition application, tracing contact positions of the conductive object moved through the position sensing module if it is sensed that the conductive object is in contact with the human body through the contact sensing module, storing information of the traced contact positions if it is sensed that the human body contact of the conductive object is released through the contact sensing module, and recognizing the contact position information as a character and displaying the information on the display if a contact input of the conductive object ends.

The processor may be configured for recognizing a position at which the conductive object is in contact through the position sensing module upon recognizing the human body contact of the conductive object through the contact sensing module, and displaying a guide pointer at a corresponding position of a screen displayed on the display on the basis of the recognized contact position.

The processor may be configured for displaying an item image on the display, upon recognizing the human body contact of the conductive object through the position sensing module, moving and displaying the guide pointer by recognizing a movement of the conductive object which moves on the human body through the position sensing module, and determining a position at which the human body is in contact as a corresponding item position if the guide pointer is located at a position of the item image.

The processor may execute and display an application associated with the corresponding item on the display if the contact position of the conductive object is an item position.

The electronic device may further include a communication module connected to the external electronic device. The processor may be configured for connecting to the external electronic device through the communication module, recognizing the human body contact of the conductive object through the contact sensing module, recognizing the contact position to which the conductive object is moved through the position sensing module, and generating control data in the contact position information, and transmitting the generated control data to the external electronic device through the communication module.

The control data may be a character and/or a gesture. The processor may generate a control signal of the external electronic device corresponding to the character and/or the gesture and may transmit the control signal through the communication module.

Figure 9:
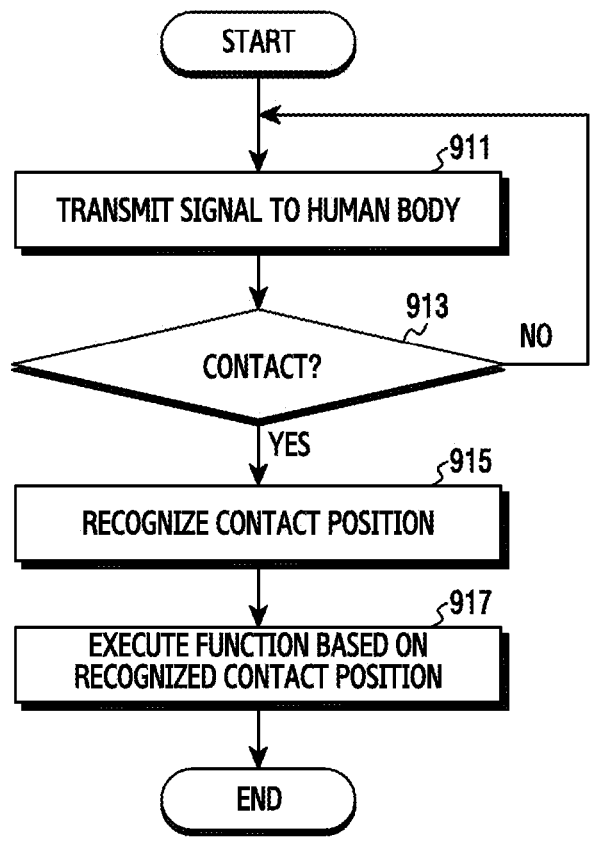
FIG. 9 is a flowchart illustrating an operation of a wearable electronic device according to various exemplary embodiments of the present invention.

FIG. 9 is a flowchart illustrating an operation of a wearable electronic device according to various exemplary embodiments of the present invention.

Referring to FIG. 9, in step 911, the wearable electronic device (e.g., the processor 100 of FIG. 1) may transmit an electric signal to a human body medium. The electric signal may be sensed through a contact sensing module (e.g., the contact sensing module 180 of FIG. 1). In step 913, the wearable electronic device may sense whether a conductive object located outside the electronic device is in contact with a human body through the contact sensing module. When a user is in contact with the human body, the wearable electronic device may sense a contact of the user through the contact sensing module in step 913, and may sense a contact position of a conductive object located outside the electronic device and in contact with the human body through the position sensing module (e.g., the position sensing module 190 of FIG. 1) in step 915. In step 915, the wearable electronic device may transmit a signal for sensing an object through a transmitting element of the position sensing module, and may receive a signal reflected from the object. The wearable electronic device may analyze signals received from the position sensing module to analyze a position (e.g., coordinate values x and y) of an object in contact (a conductive object, for example, a finger, a pen, etc.). Upon recognizing the position of the object in contact with the human body outside the electronic device, in step 917, the wearable electronic device may display a graphic in a region of a display (for example, the display module 150 of FIG. 1) corresponding to the contact position. The user may generate various types of contact inputs when in contact with the human body. For example, the contact input may include an input for selecting an item image (e.g., an icon, a soft button, etc.) displayed on the display of the wearable electronic device, a character input (e.g., an alphabet, a numeric number, a symbol, etc.), a gesture input (e.g., up, down, left, and right drag inputs, etc.), or the like.

According to one exemplary embodiment, the graphic displayed on the display may be based on an application to be executed on the wearable electronic device. For example, when an item screen is displayed, the wearable electronic device may display an indicator and/or a selection input at a position of a screen corresponding to the position at which the human body is in contact. For example, when a character recognition application is executed, the wearable electronic device may sense positions in contact with the human body, recognize them as characters, and may display the recognized characters on the display. For example, when in a state of being connected with an external electronic device, the wearable electronic device may sense positions to be in contact with the human body to generate control data, and may transmit the generated control data to the external electronic device.

Figure 10A:
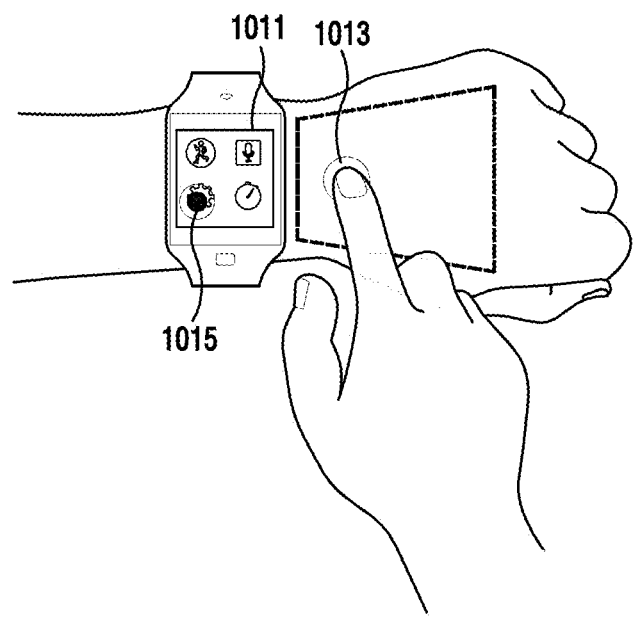
FIG. 10A to FIG. 10C illustrate an example of a contact input that can be recognized in a wearable electronic device according to various exemplary embodiments of the present invention.
Figure 10B:
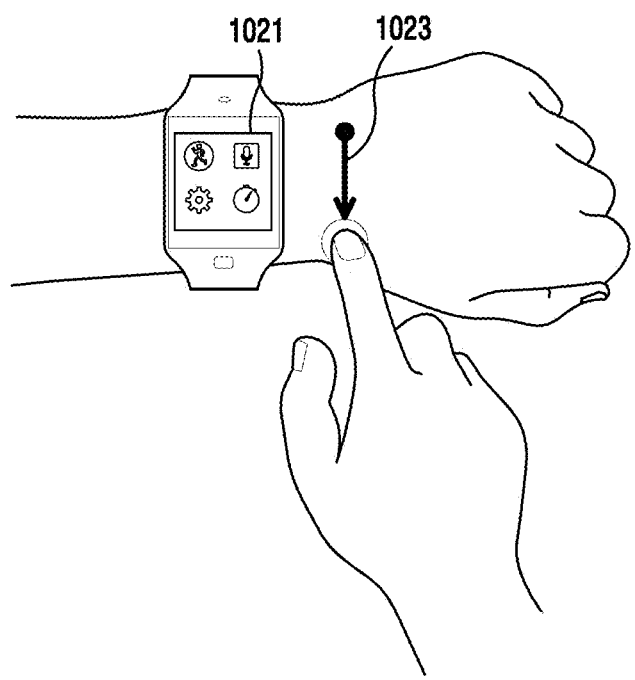
Figure 10C:
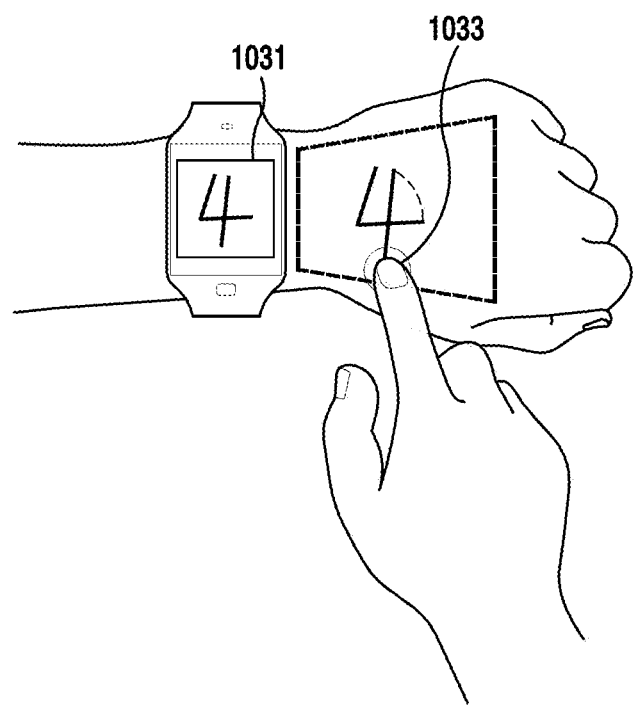

FIG. 10A to FIG. 10C illustrate an example of a contact input that can be recognized in a wearable electronic device according to various exemplary embodiments of the present invention.

Referring to FIG. 10A, the wearable electronic device may display an item image screen 1011 on a display. The item image screen may be an image such as an icon or a soft button or the like for performing a function of the wearable electronic device. In a state of displaying the item image screen 1011, the wearable electronic device may display a guide pointer 1015 on the display on the basis of the recognized contact position 1013. If the contact position is a position of a desired item image (e.g., if the guide pointer is displayed at a desired item image position), a user of the wearable electronic device may release a contact at a corresponding position. If the contact is released, the wearable electronic device may perform a function of being mapped to the item image of the contact release position.

Referring to FIG. 10B, the wearable electronic device may display a screen of an application for controlling an operation by a gesture on the display. For example, the application of which the operation is controlled by the gesture may be a view application (e.g., an application such as a photo, an ebook, an Internet application, etc.). For example, the gesture may be up, down, left, and right drags. The wearable electronic device may display an application screen on a screen 1021 of the display. When a user releases a contact input of the gesture (e.g., up, down, left, and right drags) on a human body, the wearable electronic device may confirm a contact release position at a start position of the contact input to confirm a gesture input 1023 (e.g., a touch pattern, a touch drag direction, etc.). The wearable electronic device may execute the operation of the application according to the confirmed gesture.

Referring to FIG. 10C, the wearable electronic device may display a character recognition application on the display. The character recognition application may include an application for recognizing a character and an application for executing a function by the recognized character. The character recognition application may be a message application (a short message service, an email message service, a multi-media message service, a social network service, etc.), a search application (e.g., a browser application), or the like. Further, the character recognition application may also include an application coupled to an external electronic device to control the operation of an external electronic device. When the contact is recognized through the contact sensing module, the wearable electronic device may activate the position sensing module to confirm a contact position of an object. A user may perform an operation of moving the object in a state of being touched to create a character 1033. When the object moves in the state of being in contact, the wearable electronic device 1031 may trace a position of the object. If the contact of the object is released, the wearable electronic device may store contact movement information of up to a position at which the contact is released. While repeating such an operation, if an operation of the contact input ends (e.g., after the contact is released, if a next contact is not recognized during a set time), the wearable electronic device may perform the character recognition operation on the basis of the contact movement information. When the character recognition ends, the wearable electronic device may store the recognized character or perform a character-based control operation.

Figure 11:
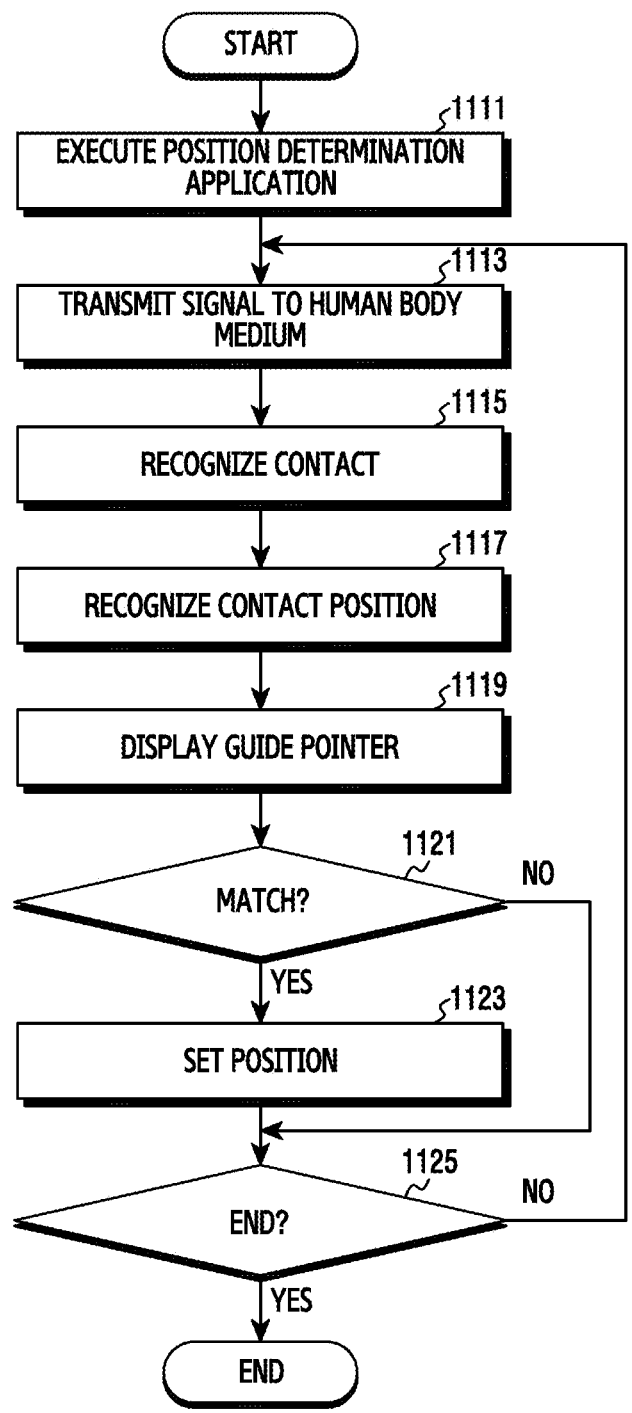
FIG. 11 is a flowchart illustrating an operation in which a wearable electronic device sets a position on the basis of a contact according to an exemplary embodiment of the present invention.

FIG. 11 is a flowchart illustrating an operation in which a wearable electronic device sets a position on the basis of a contact according to an exemplary embodiment of the present invention.

Referring to FIG. 11, in step 1111, the wearable electronic device (e.g., the processor 100 of FIG. 1) may execute a position determination application by a user's configuration. The position determination application may be an application which maps an item image of a screen displayed on a display and a contact position of a human body. The position determination application may map the item image and the position of the object to be in contact with the human body from the outside of the electronic device by learning. When the position determination application is executed, the wearable electronic device may transmit a signal to the human body medium through the contact sensing module (for example, the contact sensing module 180 of FIG. 1) in step 1113, and may sense whether the object is in contact with the human body from the outside of the electronic device through the contact sensing module in step 1115. Upon recognizing the object in contact with the human body, in step 1117, the wearable electronic device may recognize a contact position of the object through the position sensing module (for example, the position sensing module 190 of FIG. 1). Upon confirming the contact position, in step 1119, the wearable electronic device may display a guide pointer at a position corresponding to a display screen. A user may confirm a position of the guide pointer displayed on the display screen. For example, if the guide pointer is not matched with an item image display position of the screen, the user may change the contact position. If the contact position is changed, the wearable electronic device may recognize that the contact position is not matched with the item image position in step 1121, and returning to step 1113, may repetitively perform an operation of sensing a contact of the object and sensing a contact position of the object.

The user may confirm the display position of the guide pointer displayed on the screen while changing the contact position of the object. If the guide pointer position is matched with the display position of the item image, the wearable electronic device may recognize this in step 1121, and may set a specific region including the contact position as a region of a corresponding item image in step 1123. The user may change the contact position to map a display position of item images displayed on a screen while changing the contact position. In addition, if the position of the guide pointer is matched with the item display position, the wearable electronic device may recognize this in step 1121, and may set a specific region around the contact position as a contact region of a corresponding item image in step 1123. The user may set a contact region of all item images displayed on the screen. If a position determination ends (e.g., if a contact is not recognized for more than a set time or if an ending input is sensed), the wearable electronic device may recognize this in step 1125, and may end a position determination application.

Figure 12A:
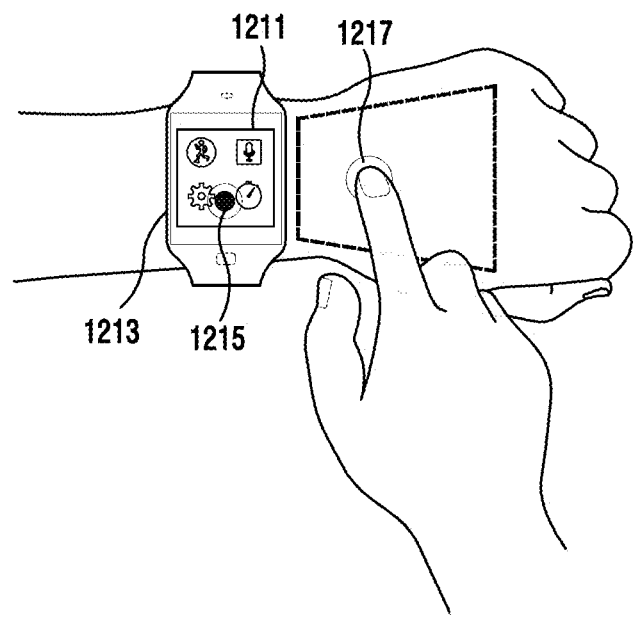
FIG. 12A to FIG. 12C illustrate an operation in which a wearable electronic devices determines a position on the basis of a contact.
Figure 12B:
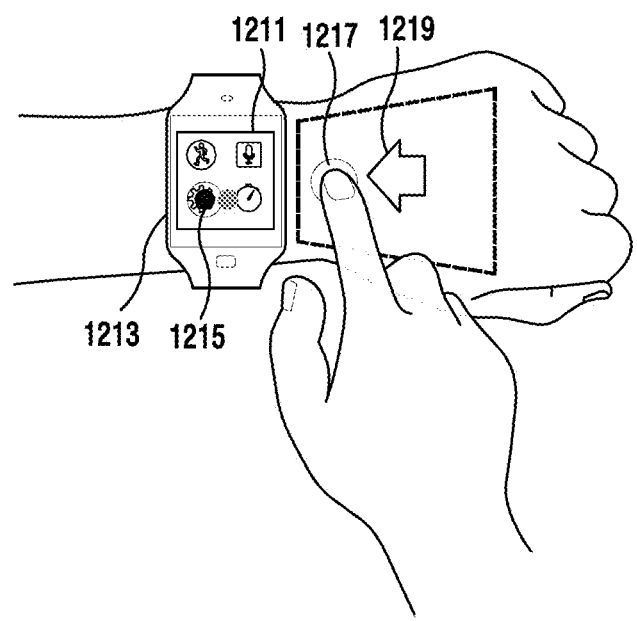
Figure 12C:
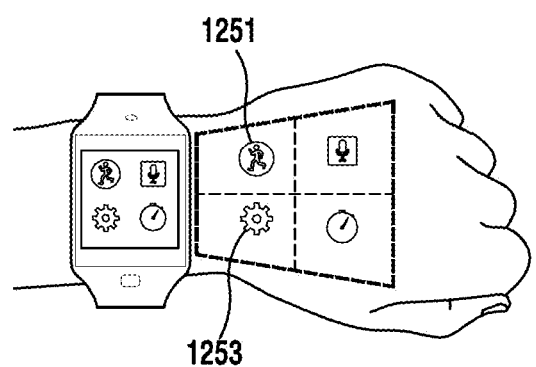

FIG. 12A to FIG. 12C illustrate an operation in which a wearable electronic devices determines a position on the basis of a contact.

When using the wearable electronic device for the first time, a position of a human body of a user (e.g., a back of the hand of the user) may not be matched with an item display position of a display. In addition, if the wearable electronic device is used for the first time, an operation (e.g., a position determination application) may be performed to match a display position of an item image displayed on a screen with a contact position of the human body. When the position determination application is executed, the wearable electronic device may display a guide pointer at a position of a screen corresponding to the contact position of the human body of the user. For example, the wearable electronic device may display the guide pointer at the position of the screen corresponding to the human body contact of the user, and may learn this to map the position of the item image with the continuously recognized contact position.

Referring to FIG. 12A, when the position determination application is executed, the wearable electronic device may recognize a human body contact through the contact sensing module, and may recognize a contact position 1217 of an object through the position sensing module. Upon recognizing the contact position 1217 of the object, the wearable electronic device may display a guide pointer 1215 at a position of a display screen 1211 corresponding to the contact position 1217. At least one item image 1213 may be displayed on the display screen 1211. In this case, if the contact occurs for the first time, the contact position 1217 may be displayed at a position where it is not matched with the position of the item image 1213 similarly to the guide pointer 1215 of FIG. 12. It is shown for example that the display position of the guide pointer 1215 of FIG. 12A is located between two item images. If the guide pointer 1215 is displayed between the item images as shown in FIG. 12A, the wearable electronic device may not perform an operation of mapping the contact position 1217.

Referring to FIG. 12B, a user may recognize that the contact position 1217 is located between the item images as shown in FIG. 12A on the basis of the guide pointer 1215, and may move as indicated by a reference number 1219 to change the contact position 1217. If the contact position is changed, the wearable electronic device may recognize the changed contact through the contact sensing module, and may recognize the changed contact position through the position sensing module. If the contact position is changed, the wearable electronic device may change the display position of the guide pointer 1215 as shown in FIG. 12B. In this case, if the display position of the guide pointer 1215 is matched with the display position of the item image, the wearable electronic device may set a specific region around the corresponding contact position 1217 as a contact region of the item image 1213, and may store position information corresponding to the contact region.

Referring to FIG. 12C, a contact region corresponding to all item images displayed on the screen 1211 of the display may be set if the operations of FIG. 12A and FIG. 12B are repetitively performed. For example, the contact region of the item images displayed on the screen 1211 of FIG. 12B may be set as shown in FIG. 12C. In FIG. 12C, the region 1215 may correspond to a region where item images are displayed on a display screen, and the respective regions 1251 may include contact regions of the item image. For example, the contact region of item image 1213 may be mapped as shown in the region 1253.

Figure 13:
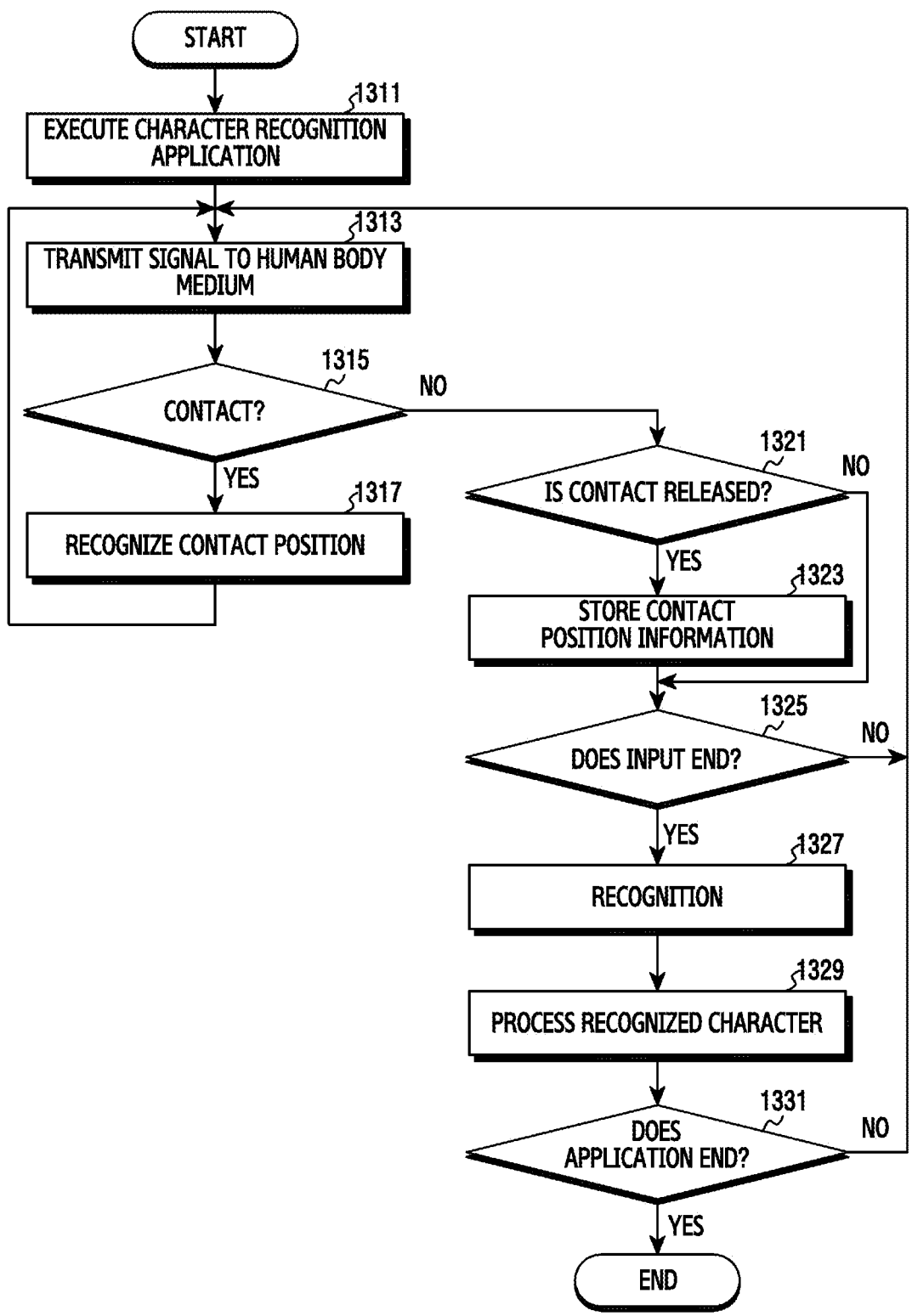
FIG. 13 is a flowchart illustrating a character recognition procedure of a wearable electronic device according to various exemplary embodiments of the present invention.

FIG. 13 is a flowchart illustrating a character recognition procedure of a wearable electronic device according to various exemplary embodiments of the present invention.

Referring to FIG. 13, the wearable electronic device (e.g., processor 100 of FIG. 1) may execute a character recognition application in step 1311. When a character is input in the wearable electronic device, the input may be inconveniently achieved due to a small screen. Further, when the character is continuously input, if a touch is released to input a next stoke of the character, the wearable electronic device may not be able to recognize the touch release and thus may incorrectly recognize the character. Therefore, when the character is recognized in the wearable electronic device, the inconvenience of the inputting may be eliminated by creating the character in a human body. Further, when the character is created in the wearable device, a contact duration and a contact release duration may be recognized. Therefore, even if a touch is released for the next stroke while the character is being created, the character may be normally recognized. The character recognition application may be a message application, a search application, an application connected to an external electronic device and capable of controlling an operation of the external device by using the character, or the like.

When the character recognition application is executed, the wearable electronic device may transmit a signal to a human body medium through the contact sensing module (e.g., the contact sensing module 180 of FIG. 1) in step 1313, and may sense whether the human body is in contact with an object (a conductive object) located outside the electronic device through the contact sensing module in step 1315. Upon sensing the human body contact of the object, the wearable electronic device may recognize a position at which the object is in contact in step 1317. For example, upon recognizing the human body contact of the object, the wearable electronic device may recognize the position of the object in contact through the position sensing module (e.g., the position sensing module 190 in FIG. 1). Upon confirming the contact position, the electronic device may store information of the confirmed contact position. If a character is input, a user may move the object in a state where the object is in contact with the human body, and may move the object in a state where the object is not in contact with the human body. The wearable electronic device may recognize and store information of a position at which the object is moved in state where the object is in contact or not in contact with the human body. In this case, a shape of a stoke may be recognized in various forms such as a linear shape, an oblique shape, an intersection shape, a circle shape, and the like. The electronic device may store information of positions recognized along a movement trajectory of an object which is moved in the contact and non-contact state.

If the user releases the contact, the wearable electronic device may recognize the contact release in step 1321 and store a position at which the contact is released in step 1323. When the contact is released, the wearable electronic device may store contact movement information (e.g., stroke information for creating a character) which is input by the user through information of a position at which the contact is released from a first contact position in step 1323. The character may include a plurality of strokes. Therefore, the user may be in contact with the object again to input a next stroke in a state where the contact is released to input a character. After the contact is released, if a contact occurs within a set time, the wearable electronic device may recognize a movement position of an object in contact while performing step 1313 to step 1319. In addition, if the human body contact of the object is released, the wearable electronic device may recognize the contact release in step 1321, and may store information of a user's input (e.g., stroke input) continuously input in step 1323.

When the set time elapses in a state where the contact is released, the wearable electronic device may recognize an end of the character input in step 1325, and may perform the character recognition operation on the basis of the stored input information in step 1327. The character recognition operation may be an operation for recognizing a character such as a number, an alphabet, a symbol, or the like. After performing the character recognition operation, the wearable electronic device may process the recognized character in step 1329. The operation of processing the recognized character may imply an operation of performing a function configured on the basis of stored and recognized characters. For example, when an application for controlling an operation of an external electronic device is executed in a state of being connected to the external electronic device, the wearable electronic device may confirm a control function based on the recognized character, and may transmit confirmed control information to the external electronic device. If the user ends the character recognition application, the electronic device may recognize this in step 1331, and may end the character recognition application.

Figure 14A:
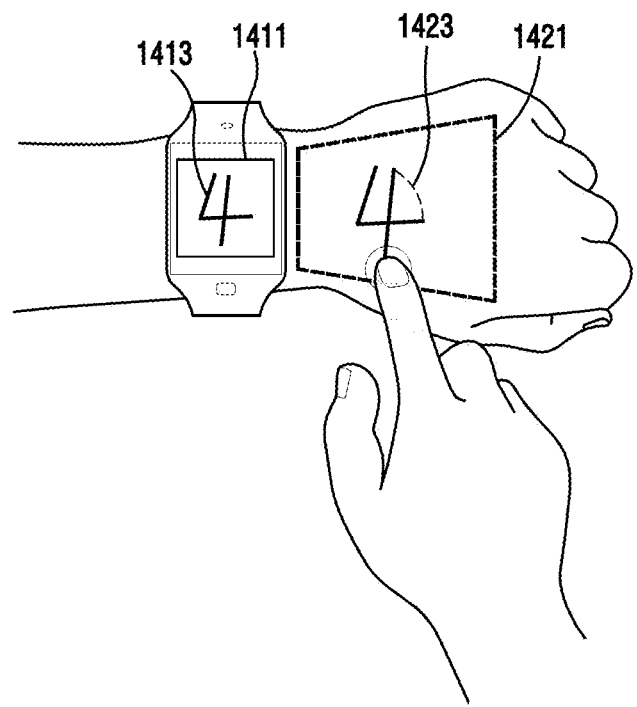
FIG. 14A and FIG. 14B illustrate an example in which a wearable electronic device performs a character recognition operation according to various exemplary embodiments of the present invention.
Figure 14B:
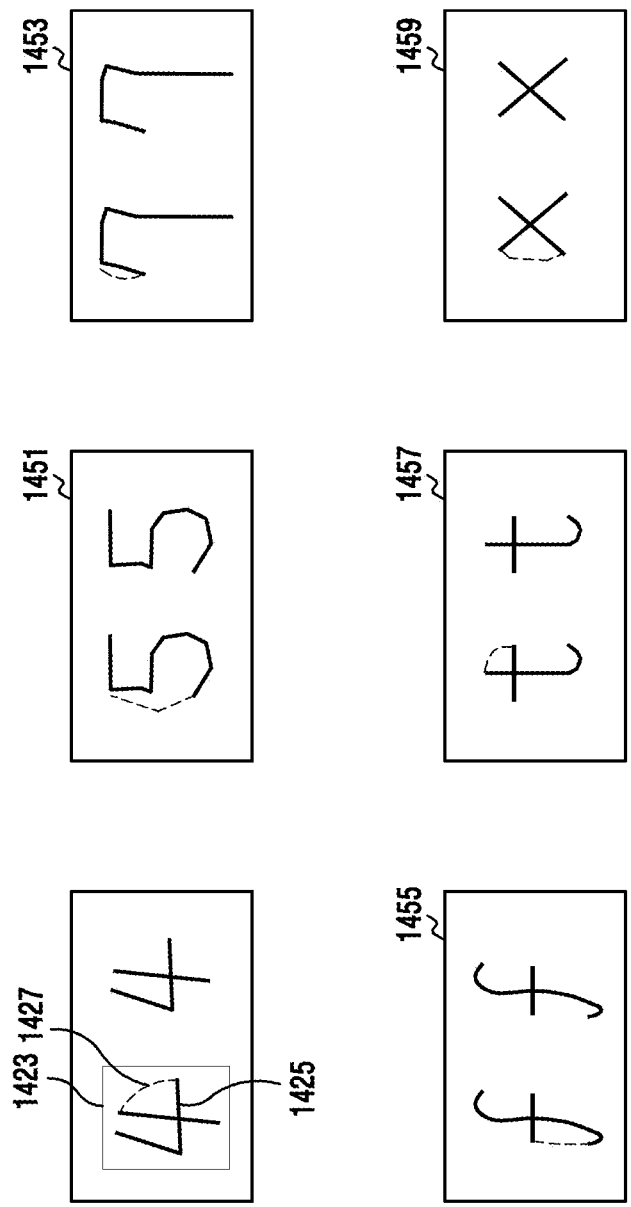

FIG. 14A and FIG. 14B illustrate an example in which a wearable electronic device performs a character recognition operation according to various exemplary embodiments of the present invention.

Referring to FIG. 14A, the wearable electronic device may display a character 1413 to be input by a user on a display screen 1411. A region 1421 for inputting characters may be configured on a human body (e.g., a user's hand or the like). If the user inputs a character 1423 in the region 1421, the wearable electronic device may display a character 1413 to be input on the screen 1411. The character 1423 input by the user may include an input in which movement is achieved in a state of being in contact as indicated by a reference numeral 1425 and a trajectory in which movement is achieved in a state where a contact is released as indicated by a reference numeral 1427. Reference numerals 1451 to 1459 of FIG. 14B may be examples of characters to be input while repeating a contact and a contact release when the characters are input. When the characters 1451 to 1459 are input, the wearable electronic device may recognize information of positions of moving from a first contact position to a position at which the contact is released, and may perform character recognition on a plurality of pieces of information (e.g., stroke information) recognized at a time of ending a character input.

Figure 15:
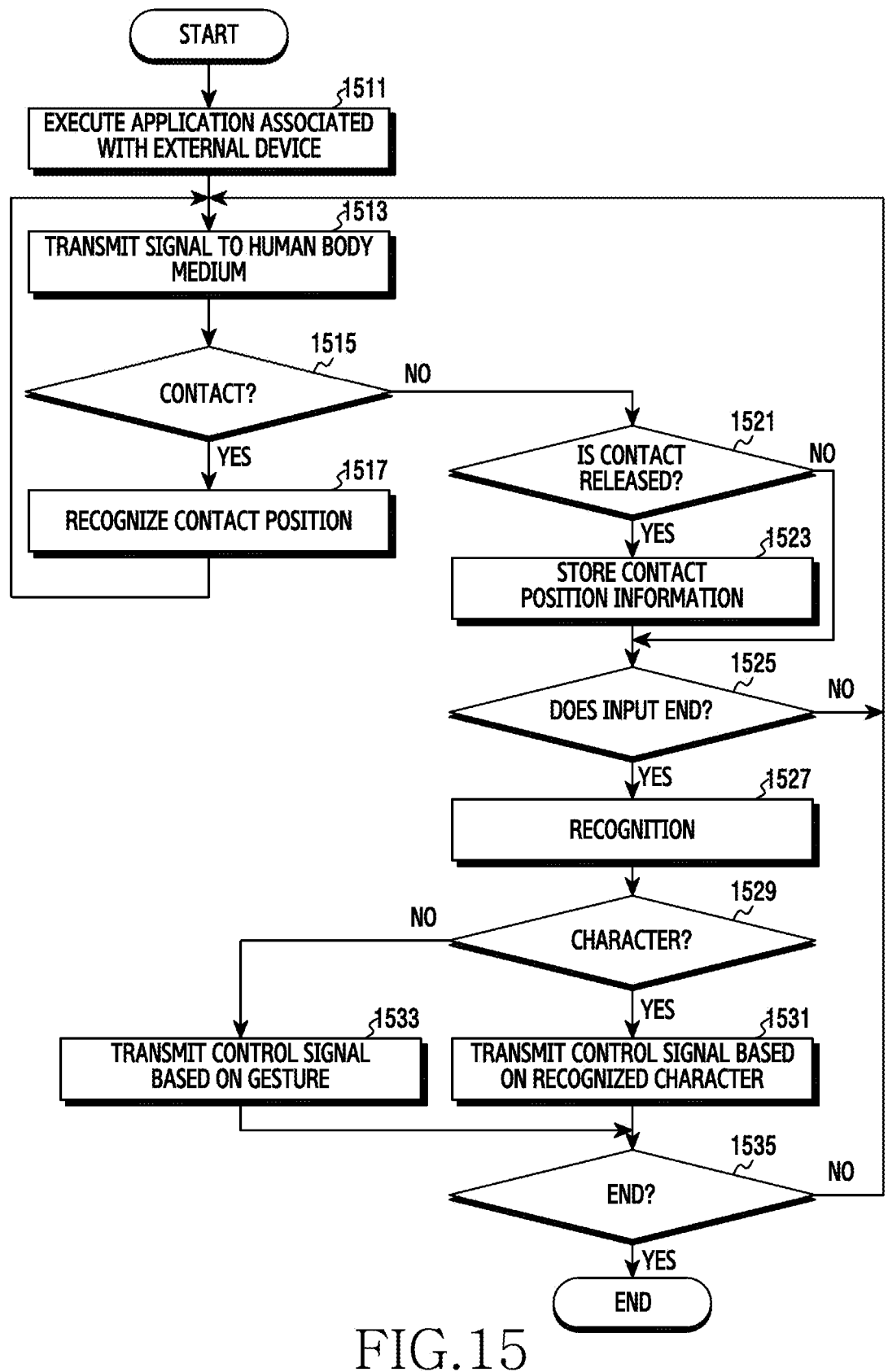
FIG. 15 is a flowchart illustrating an operation between a wearable electronic device and an external electronic device according to various exemplary embodiments of the present invention.

FIG. 15 is a flowchart illustrating an operation between a wearable electronic device and an external electronic device according to various exemplary embodiments of the present invention.

Referring to FIG. 15, the wearable electronic device (e.g., processor 100 of FIG. 1) may execute an application associated with an external device in step 1511. For example, the external electronic device may be a multimedia playback device (e.g., a television, an audio device, a set top box, etc.). The wearable electronic device may be wirelessly connected to the external electronic device through a communication module (e.g., the communication module 110 of FIG. 1). The wireless connection may be achieved by using a Bluetooth communication or Wi-Fi communication method. The wearable electronic device may generate and transmit a signal for controlling an operation of the external electronic device through human body communication in a state of being wirelessly connected (e.g., paring) with the external electronic device.

In a state of executing an application for wirelessly connecting with the external electronic device, the wearable electronic device may transmit a signal to a human body medium through a contact sensing module (e.g., the contact sensing module 180 in FIG. 1) in step 1513, and may sense whether a conductive object located outside the electronic device is in contact with a human body through the contact sensing module in step 1515. Upon sensing the human body contact of the object, the wearable electronic device may recognize a contact position of an object in contact with the human body through a position sensing module (e.g., the position sensing module 190 in FIG. 1) in step 1517. For example, upon sensing the human body contact of the object, the wearable electronic device may recognize a position of the object in contact with the human body through the position sensing module. If the contact position of the object in contact with the human body is confirmed, the electronic device may store information of the confirmed contact position. A user input may be made to control an operation or function of the external electronic device in a state of maintaining the contact. The input may be a character or gesture input. The wearable electronic device may recognize and store information of a position to be moved in a state of being in contact.

When the user releases the human body contact of the object in contact with the human body, the wearable electronic device may recognize a contact release of the object in step 1521, and may store a position at which the contact of the object is released from the human body in step 1523. If the contact is released, the wearable electronic device may store contact movement information (e.g., stroke information) input by the user through information of the position at which the contact is released from a first contact position in step 1523. The character or gesture input may include a plurality of strokes. Therefore, the user may be in contact with the object again to input a next stroke in a state where the contact is released to input a character. After the contact is released, if a contact occurs within a set time, the wearable electronic device may recognize a movement position of an object in contact with the human body while performing step 1513 to step 1519 again.

When the input ends, the wearable electronic device may recognize this in step 1525, and may recognize the input character or gesture in step 1527. For example, the wearable electronic device may recognize that the input ends when a set time elapses in a state where the human body contact of the object is released. If the recognized input is a character, the wearable electronic device may recognize this in step 1529, and may generate a control signal corresponding to the recognized character to transmit it to the external electronic device through the communication module in step 1531. If the recognized input is a gesture, the wearable electronic device may recognize this in step 1529, and may generate a control signal corresponding to the gesture to transmit it to the external electronic device through the communication module in step 1533. If an application for connecting with the external electronic device is released, the wearable electronic device may recognize this in step 1535, and may control the communication module to release a wireless connection with the external electronic device.

Figure 16A:
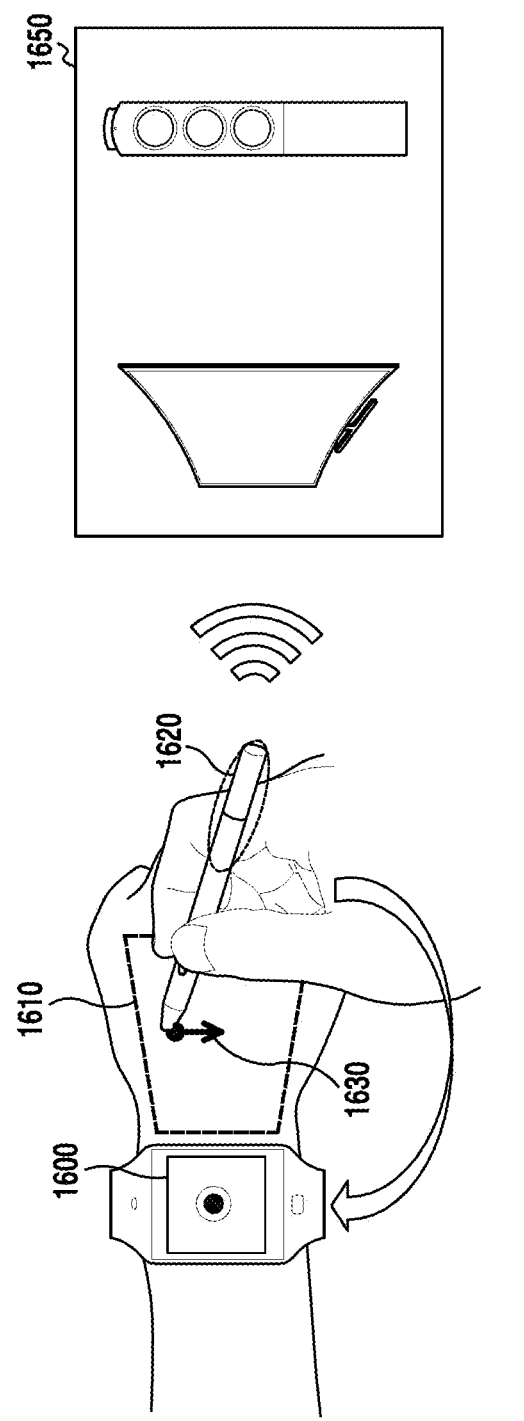
FIG. 16A and FIG. 16B illustrate an example of an operation between a wearable electronic device and an external electronic device according to various exemplary embodiments of the present invention.
Figure 16B:
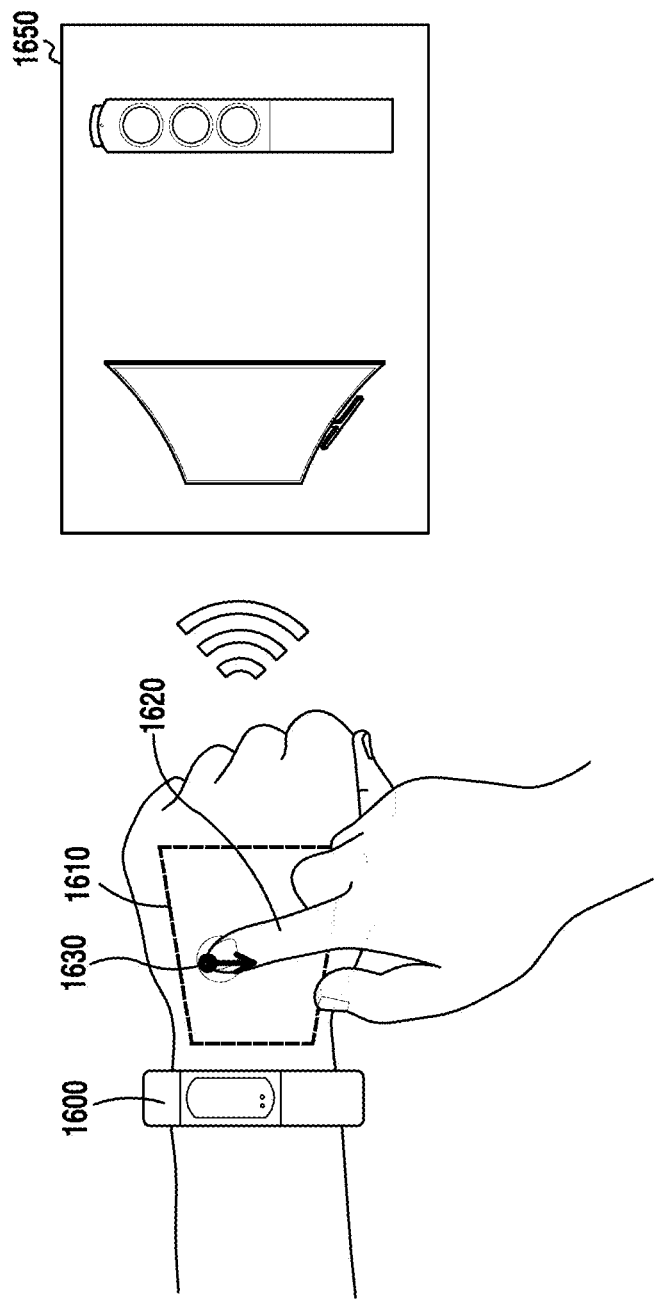

FIG. 16A and FIG. 16B illustrate an example of an operation between a wearable electronic device and an external electronic device according to various exemplary embodiments of the present invention.

Referring to FIG. 16A, a wearable electronic device 1600 may be in a state of being wirelessly connected with an external electronic device 1650 through a communication module. The wearable electronic device 1600 may include a contact sensing module capable of sensing a contact of a human body and a position sensing module capable of sensing a contact position of an object. If an object 1620 is in contact with a region 1610, the contact sensing module may sense a human body contact of the object 1620 through human body communication. In FIG. 16A, the object may be a pen (e.g., an electronic pen). If the pen 1620 is in contact with the region 1610, the wearable electronic device 1600 may recognize a human body contact of the pen and analyze a contact position of the object. If a user performs an operation of an input 1630 (e.g., a character input or a gesture input) by using the pen 1620, the wearable electronic device 1600 may recognize the input on the basis of movement of the pen 1620. In this case, the input 1630 may be a character or a gesture. The wearable electronic device 1600 may analyze the recognized input 1630 to generate a signal for controlling the external electronic device 1650 and may transmit the control signal to the external electronic device 1650 through the communication module.

The electronic pen 1620 may include a circuit capable of sensing a contact and a contact position. For example, the electronic pen 1620 may not only be capable of sensing a human body contact (touch and release) but also have its own circuitry and power. In this case, the electronic pen 1620 may perform an operation of sensing the human body contact of the pen and an operation of recognizing a contact position, and may transmit information of the recognized contact position to the wearable electronic device 1600. Then, the wearable electronic device 1600 may analyze the position information transmitted to the pen 1620 and may transmit a signal for controlling the operation of the external electronic device 1650. Further, the pen 1620 may sense the human body contact and recognize the contact position, and thereafter may directly transmit a control signal based on the recognized result to the external electronic device 1650. In this case, the operation of the external electronic device 1650 may be controlled by recognizing the human body contact and the position in the pen 1620 without the aid of the wearable electronic device.

Referring to FIG. 16B, the wearable electronic device 1600 may be in a state of being wirelessly connected with the external electronic device 1650 through a communication module. The wearable electronic device 1600 may include a contact sensing module capable of sensing a contact of a human body and a position sensing module capable of sensing a contact position of an object. In FIG. 16B, the object may be a finger. If a finger 1640 is in contact with the region 1610, the contact sensing module may sense a human body contact of the finger 1640 through human body communication. If the finger 1640 is in contact with the region 1610, the wearable electronic device 1600 may recognize the human body contact, and may recognize a position at which the finger is in contact with the human body. The wearable electronic device 1600 may analyze the recognized contact positions to recognize the character or gesture input by the finger 1640, and may generate a signal for controlling the external electronic device 1650 on the basis of the recognition result. Thereafter, the wearable electronic device 1600 may transmit a control signal to the external electronic device 1650 through the communication module to control the operation of the external electronic device 1650.

For example, the external electronic device 1650 may be a television, and the wearable electronic device 1600 may operate as an input device (e.g., a remote controller) of the external electronic device 1650. A user may use the pen or finger to make an input to the human body to control a channel or volume of the external electronic device 1650. For example, the wearable electronic device 1600 may recognize a character or gesture (e.g., up, down, left, and right drag operations) by tracing a contact path of an object (e.g., a finger, a pen, etc.) to be in contact with the human body. For example, if a number is recognized, the wearable electronic device 1600 may transmit the recognized number as channel selection information to the external electronic device 1650. In case of a drag input, the wearable electronic device 1600 may configure volume control information according to a direction and a drag length, and may transmit it to the external electronic device 1650.

Therefore, when manipulating the external electronic device, the operation of the external electronic device may be controlled through the human body such as a back of the hand, a palm, or the like without confirming a separate control device. For example, the user may control an operation of a television through the human body while watching the television. For example, when a screen of the external electronic device is displaying a web browser screen, the user may generate a character input for searching or inputting data to the human body, and the wearable electronic device may recognize a contact position recognized through the human body to generate character data, and may transmit the generated character data to the external electronic device.

Figure 17:
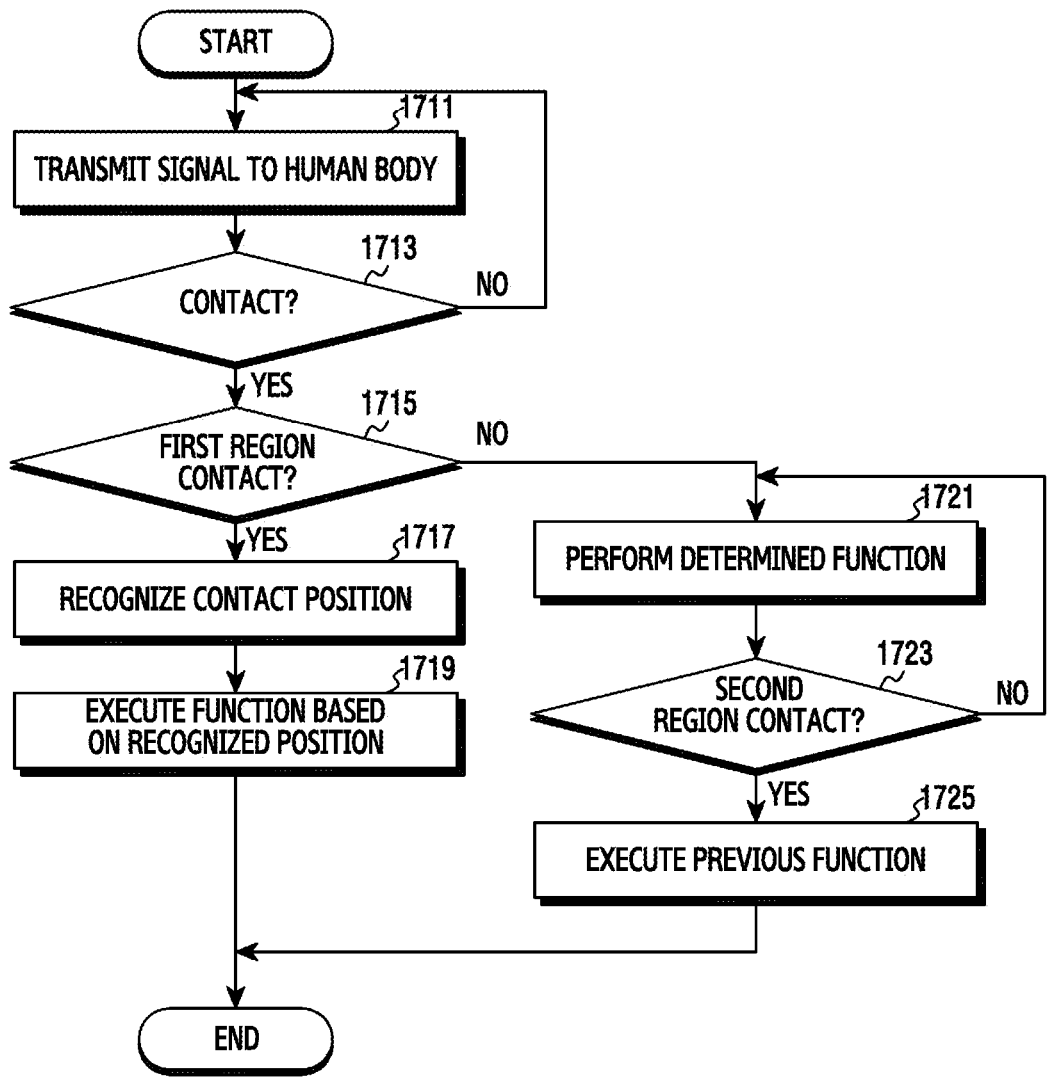
FIG. 17 is a flowchart illustrating a procedure in which a wearable electronic device controls an operation depending on an input based on human body communication according to various exemplary embodiments of the present invention.

FIG. 17 is a flowchart illustrating a procedure in which a wearable electronic device controls an operation depending on an input based on human body communication according to various exemplary embodiments of the present invention.

Referring to FIG. 17, a wearable electronic device (e.g., processor 100 of FIG. 1) may execute a determined application to display a screen of an application executed on the display. The wearable electronic device may recognize an input based on a human body contact to control an operation of the wearable electronic device. In a state of executing the application, the wearable electronic device may transmit a signal to a human body medium located outside the electronic device through a contact sensing module (e.g., the contact sensing module 180 of FIG. 1) in step 1711, and may sense whether a human body is in contact with an object to be in contact with the human body from the outside the electronic device through a contact sensing module in step 1713. Upon sensing the human body contact, the wearable electronic device may sense a position of the object in contact with the human body from the outside of the electronic device through the position sensing module in step 1715. The contact sensing module and the position sensing module may sense a contact and position of a first region of the human body in the same manner as in FIG. 6 and FIG. 7. That is, if the wearable electronic device senses the human body contact of the object, the wearable electronic device may output a signal for sensing a contact position in a direction of the first region of the human body through the position sensing module, and may analyze the signal sensed from the first region to sense the contact position of the object. In this case, if the signal for sensing the object is received from the first region, the wearable electronic device may sense that the object is in contact with the first region of the human body. If the wearable electronic device senses that the object is in contact with the first region of the human body, in step 1717, the wearable electronic device may analyze the signal received through the position sensing module to recognize the contact position of the first region. After recognizing the contact position, the wearable electronic device may confirm an input signal on the basis of the contact position of the first region, and may display a running application to a display according to the confirmed input signal.

If the signal for sensing the object in contact with the first region is not received through the position sensing module, the wearable electronic device may determine that the object is in contact with a second region of the human body in step 1715. In case of the contact of the second region, in step 1721, the wearable electronic device may stop a currently running application (e.g., switch to a background application), may execute the determined application, and may display the determined application on the display. The determined application may be an application executed most frequently by a user. For example, the determined application may be a watch application which displays a current time. If the user is in contact with the second region of the human body while the determined application is running, in step 1723, the wearable electronic device may sense that the object is in contact with the second region of the human body through the contact sensing module and the position sensing module. Upon sensing the contact of the second region, in step 1725, the wearable electronic device may execute the stopped application again (e.g., switch the application switched to the background to a foreground application), and may display the running application on a display.

Figure 18A:
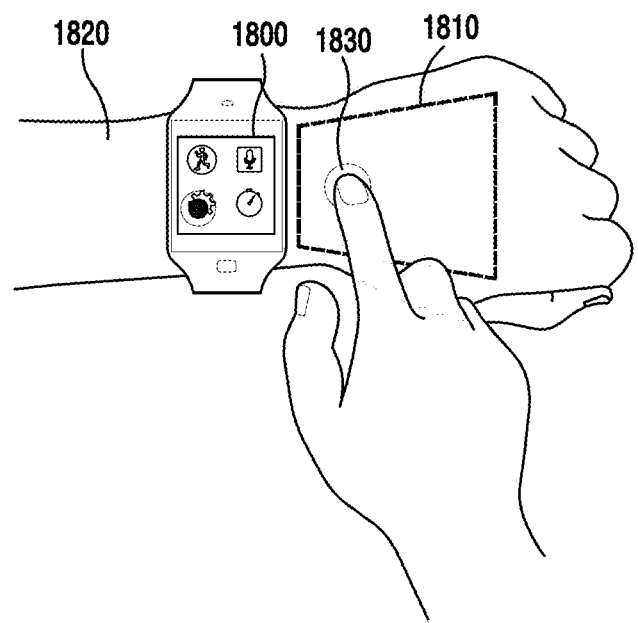
FIG. 18A and FIG. 18B illustrate an example in which a wearable electronic device performs an operation depending on an input based on human body communication according to various exemplary embodiments of the present invention.
Figure 18B:
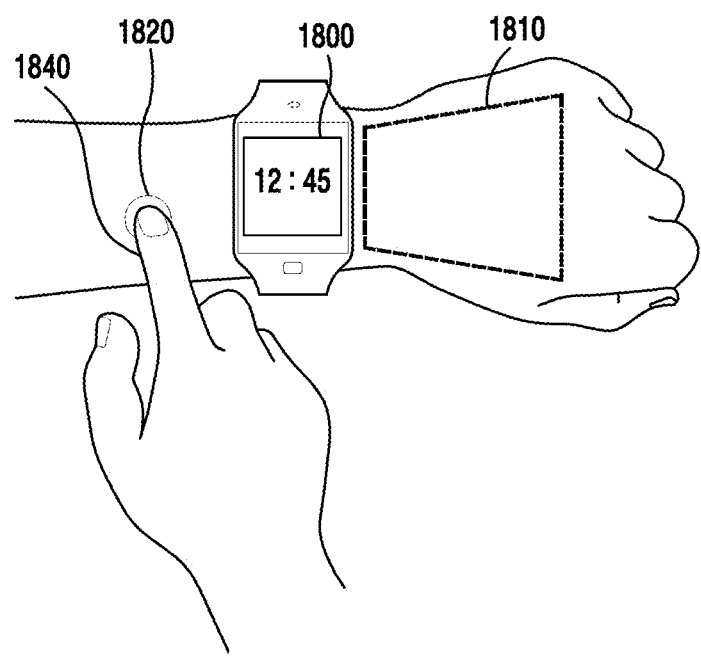

FIG. 18A and FIG. 18B illustrate an example in which a wearable electronic device performs an operation depending on an input based on human body communication according to various exemplary embodiments of the present invention.

Referring to FIG. 18A and FIG. 18B, a wearable electronic device 1800 may include a contact sensing module and a position sensing module. A first region 1810 of a human body may correspond to a direction of transmitting a signal of the position sensing module of the wearable electronic device 1800, and a second region 1820 of the human body may correspond to a direction of transmitting a signal by the position sensing module. As shown in FIG. 18A, a running application may be displayed on a display screen of the wearable electronic device 1800. In addition, if a contact 1830 of an object occurs in the first region 1810, the contact sensing module may sense a human body contact of the object, and the position sensing module may sense a contact position at which the first region 1810 of the human body is in contact. Therefore, the wearable electronic device 1800 may recognize a contact of the first region 1810 of the human body and a position at which the object is in contact. The wearable electronic device 1800 may control an operation of the application based on the recognized contact position, and may display it on the display.

If an object is in contact with the second region 1820 of the human body of a user as shown in FIG. 18B, the wearable electronic device 1800 may recognize a human body contact 1840 through the contact sensing module. In this case, the position sensing module may not be able to detect the human body contact 1840 of the second region 1820 corresponding to a direction opposite to the direction of transmitting a signal. If the position of the contact 1840 of the object is not recognized, the wearable electronic device 1800 may determine that the human body is in contact with the second region 1820, may stop a running application, and may display a screen of a determined application (e.g., a watch application) on a display screen. For example, the wearable electronic device 1800 may switch the displayed screen to a background application. Further, upon recognizing the contact 1840 of the second region 1820 while a screen of the determined application is displayed, the wearable electronic device 1800 may end the displaying of the determined application, and may display the screen of the stopped application as shown in FIG. 18A. For example, upon recognizing the contact of the second region 1820 while the determined application is running, the wearable electronic device 1800 may display the application switched to the background on the display screen.

The wearable electronic device 1800 may configure a human body region in a direction in which the position sensing module outputs a signal as the first region 1810, and may configure a human body region in an opposite direction thereof as the second region. Further, upon recognizing the contact of the second region 1820, the wearable electronic device 1800 may automatically execute the determined application. The determined application may be an applicable that can be executed with a physical button such as a watch screen or the like or with a single touch. It may be difficult for the wearable electronic device 1800 to display various input UIs in a small display. Therefore, when the input operation is performed as shown in FIG. 17, the wearable electronic device 1800 may perform a specific function with a single contact.

FIG. 17 and FIG. 18A to FIG. 18B may be examples in which, when the wearable electronic device recognizes a human body contact (e.g., a skin touch), if the position sensing module does not recognize a contact position, it is determined that the second region 1820 is in contact. For example, as shown in FIG. 3 and FIG. 6, the contact sensing module 180 of FIG. 1 may be configured such that the transmitting electrode 320 is firmly attached to a human body in a direction of the second region 1820, and the receiving electronic 350 may be firmly attached to the human body in the first region 1810. If the contact with the human body does not occur, the receiving electrode 350 may directly receive electric current transmitted from the transmitting electrode 320, and if the contact is sensed, a part of the electric current transmitted from the transmitting electronic 320 flows towards a contact object (e.g., a conductive object), which may lead to a decrease in amount of electric current sensed in the receiving electronic 350. In this case, an electric current amount decreased by the contact of the first region 1810 may be different from an electric current amount decreased by the contact of the second region 1820. Therefore, the wearable electronic device 1800 may determine the contact of the first region 1810 or the contact of the second region 1820 on the basis of the electric current amount decreased by the object contact.

According to various exemplary embodiments of the present invention, a method of operating an electronic device may include sensing a human body contact of a conductive object located outside the electronic device, sensing a human body contact position of the conductive object located outside the electronic device, and displaying a graphic in a region of a display corresponding to the sensed human body position of the conductive object.

The sensing of the human body contact of the conductive object may include transmitting a signal to a human body outside the electronic device, and receiving the signal, which is changed depending on whether the conductive object is in contact with the human body, through the human body, recognizing whether the conductive object is in contact with the human body on the basis of a change in the received signal.

The recognizing of the human body contact position of the conductive object may include transmitting a signal for sensing a contact position of the conductive object to the human body, receiving a signal reflected from the conductive object in contact with the human body through at least two receiving elements, and sensing a human body contact position of the conductive object on the basis of a position and reception signal strength of the receiving elements.

The sensing of a human body contact position of the conductive object may include transmitting a signal for sensing a contact of the conductive object in a first region of the human body upon sensing the human body contact position of the conductive object, receiving a signal reflected from the conductive object in contact with the human body through at least two receiving elements, recognizing a position of a first region of the human body with which the conductive object is in contact on the basis of a position and reception signal strength of the receiving elements, and if the contact position of the conductive object is not recognized in the first region, sensing this as a contact of a second region of the human body. The displaying of the graphic in the region on the display may further include displaying a determined application upon recognizing the contact of the second region of the human body for the conductive object.

The displaying of the determined application may further include, if the contact of the conductive object is sensed in the second region of the human body in a state of displaying the determined application, ending the displaying of the determined application, and displaying the previous application switched to the background.

The displaying of the graphic in the region on the display may further include executing a character recognition application. The executing of the character recognition application may include, if it is sensed that the conductive object located outside the electronic device is in contact with the human body, sensing positions at which the conductive objects are in contact with the human body, if it is recognized that the human body contact of the conductive object is released, storing information of the positions at which the conductive objects are in contact, and recognizing and displaying the contact position information by analyzing the information as a character.

The displaying of the graphic in the region of the display may include displaying a guide pointer at a corresponding position of a display on the basis of the position at which the conductive object is in contact, and if a position of the guide pointer is an item position, displaying an application corresponding to a selected item on the display.

The operating method of the electronic device may further include connecting to the external electronic device through the communication module, sensing the human body contact of the conductive object located outside the electronic device, sensing a human body contact position of the conductive object located outside the electronic device, generating control data of the external electronic device on the basis of the sensed contact position, and transmitting the control data in the external electronic device through the communication module.

According to various exemplary embodiments of the present invention, a wearable electronic device and an operating method thereof can generate an input signal of an electronic device by being in contact with a surrounding space (e.g., a human body such as skin or the like) of the electronic device without having to be directly in contact with a screen of the electronic device having a small display screen. According to various exemplary embodiments of the present invention, the wearable electronic device can generate various touch inputs through the human body irrespective of the small screen.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device worn by a user, the electronic device comprising:
   a housing comprising a first surface facing a first direction and a second surface facing a second direction opposite to the first direction;
   a display viewed through the first surface;
   a first sensor disposed in the second surface, wherein the first sensor is contacted on a first portion of a body of the user when the electronic device is worn by the user;
   a second sensor; and
   a processor operatively coupled to the display, the first sensor and the second sensor, wherein the processor is configured to:
      identify that the body of the user is contacted by a conductive object, based on a change of intensity of a signal transmitted to the body of the user from the first sensor and measured by the first sensor,
      based on the identification that the body of the user is contacted by the conductive object, by using the second sensor, recognize a contact location of the conductive object and determine whether the recognized contact location is on a second portion of the body,
      based on a determination that the recognized contact location is on the second portion, track a change of the recognized contact location of the conductive object by using the second sensor, and
      display a guidance pointer on the display corresponding to the recognized contact location of the conductive object.

2. The electronic device of claim 1, wherein the first sensor comprises:
   a transmitter that transmits the signal to the body of the user; and
   a receiver that receives the signal of which intensity changes according to whether the body of the user is contacted by the conductive object,
   wherein the processor is further configured to recognize the change of intensity of the signal flowing through the body of the user.

3. The electronic device of claim 1,
   wherein the first portion is a wrist of the user,
   wherein the second portion is a back of a hand of the user,
   and wherein the conductive object is a finger of the user.

4. The electronic device of claim 2, wherein the second sensor comprises:
   a position transmitter that transmits a position signal in a direction of the second portion of the body; and
   a position receiver comprising at least two receiving elements to receive an object signal of which the position signal is reflected by the conductive object in contact with the body of the user,
   wherein the processor is configured to:
      recognize the change of the contact location of the conductive object based on a position of the at least two receiving elements and intensity of the object signal.

5. The electronic device of claim 4,
   wherein the position transmitter of the second sensor transmits the position signal in an opposite direction of the second portion of the body, and
   wherein the processor is further configured to:
      based on the identification that the body of the user is contacted by the conductive object, by using second sensor, determine whether the recognized contact location of the conductive object is on a third portion of the body, wherein the third portion is distinct from the second portion, and
      based on a determination that the recognized contact location is on the third portion of the body, execute a determined application and display the determined application on the display.

6. The electronic device of claim 5, wherein the processor is further configured to:
   based on the determination that the recognized contact location is on the third portion of the body, switch a running application to a background and display the determined application on the display,
   while the determined application is being displayed on the display, identify that the body of the user is contacted by the conductive object by using the first sensor and determine whether the contact location of the conductive object is on the third portion of the body by using the second sensor, and
   based on a determination that the contact location of the conductive object is on the third portion, switch the determined application to the background and display a previous application switched to the background.

7. The electronic device of claim 1, wherein the processor is configured to:
   execute a character recognition application,
   store information of the recognized contact location of the conductive object,
   recognize the information as a character by using the character recognition application, and
   display the character on the display when the conductive object is separated from the second portion of the body.

8. The electronic device of claim 1, wherein the processor is further configured to:
   display item images on the display, and
   if the guidance pointer is located at a position of one of the item images,
   determine a position at which the body is in contact as a corresponding position of the one of the item images.

9. The electronic device of claim 1, wherein the processor is further configured to:
   display item images on the display, and
   if the guidance pointer is located at one of the item images, execute an application corresponding to the one of the item images and display the application on the display.

10. The electronic device of claim 1, further comprising:
    a communication module,
    and wherein the processor operatively coupled to the communication module is further configured to:
       establish a wireless connection with an external electronic device by using the communication module, and
       generate control data in a contact location information of the conductive object, and transmit the generated control data to the external electronic device through the communication module.

11. The electronic device of claim 10,
    wherein the control data is at least one of a character or a gesture, and
    wherein the processor generates a control signal of the external electronic device corresponding to at least one of the character or the gesture and transmits the control signal through the communication module.

12. A method of operating an electronic device worn by a user, the method comprising:
    by using a first sensor in contact with a first portion of a body of the user, identifying that the body of the user is contacted by a conductive object, based on a change of intensity of a signal transmitted to the body of the user from the first sensor and measured by the first sensor;
    when identifying that the body of the user is contacted by the conductive object, by using second sensor, recognizing a contact location of the conductive object and determining whether the recognized contact location of the conductive object is on a second portion of the body of the user;
    when determining that the recognized contact location of the conductive object is on the second portion of the body of the user, tracking a change of the recognized contact location of the conductive object by using a second sensor; and
    displaying a guidance pointer on a display corresponding to the recognized contact location of the conductive object.

13. The method of claim 12, wherein identifying that the body of the user is contacted by the conductive object comprises:
    transmitting the signal to the body outside the electronic device;
    receiving the signal of which intensity changes according to whether the body of the user is in contact with the conductive object; and
    recognizing whether the body of the user is contacted by the conductive object based on the change of intensity of the received signal flowing through the body of the user.

14. The method of claim 13, wherein recognizing the contact location of the conductive object and tracking the change of the contact location of the conductive object comprises:
    transmitting a position signal in a direction of the second portion of the body;
    receiving an object signal of which the position signal is reflected by the conductive object in contact with the body of the user through at least two receiving elements included in the second sensor;

recognizing the contact location based on a position of the at least two receiving elements and intensity of the object signal; and tracking the change of the recognized contact location based on the position of the at least two receiving elements and intensity of the object signal.

15. The method of claim 12, further comprising:

determining whether the recognized contact location of the conductive object is on a third portion of the body, wherein the third portion is distinct from the second portion;

when determining that the recognized contact location of the conductive object is on a third portion of the body, executing a determined application; and displaying the determined application on the display.

16. The method of claim 15, wherein displaying the determined application further comprises:

while the determined application is being displayed on the display, identifying that the body of the user is contacted by the conductive object by using the first sensor and determining whether the contact location of the conductive object is on the third portion of the body by using the second sensor;

ending the displaying of the determined application; and displaying a previous application switched to a background.

17. The method of claim 12, wherein displaying the guidance pointer on the display corresponding to the recognized contact location of the conductive object further comprises:

executing a character recognition application;

obtaining information of the recognized contact location of the conductive object;

analyzing the information as a character by using the character recognition application; and displaying the character on the display when the conductive object is separated from the second portion of the body.

18. The method of claim 12, further comprising:

displaying item images on the display; and if a location of the guidance pointer corresponds to a location of one of the item images, executing an application corresponding to the one of the item images.

19. The method of claim 12, further comprising:

connecting to an external electronic device through a communication module;

generating control data of the external electronic device based on the recognized contact location of the conductive object; and transmitting the generated control data to the external electronic device through the communication module.

* * * * *